US007269668B2

(12) United States Patent
Redford et al.

(10) Patent No.: US 7,269,668 B2
(45) Date of Patent: Sep. 11, 2007

(54) MOBILE, SEAMLESS, TEMPORARY, WIRELESS NETWORK ACCESS APPARATUS AND METHOD

(76) Inventors: Darrell J. Redford, 1878 W. 1000 South, Layton, UT (US) 84041; G. Jeffery Hall, 3925 W. 5563 S., Roy, UT (US) 84067; Mark E. Marrott, 364 E. 100 South, Bountiful, UT (US) 84010; Shirlene G. Peck, 494 E. 765 North, Brigham City, UT (US) 84302

( * ) Notice: Subject to any disclaimer, the term of this patent is extended or adjusted under 35 U.S.C. 154(b) by 683 days.

(21) Appl. No.: 10/236,041

(22) Filed: Sep. 5, 2002

(65) Prior Publication Data

US 2003/0126298 A1 Jul. 3, 2003

Related U.S. Application Data

(60) Provisional application No. 60/361,378, filed on Mar. 1, 2002, provisional application No. 60/339,153, filed on Nov. 30, 2001, provisional application No. 60/317,483, filed on Sep. 5, 2001.

(51) Int. Cl.
*G06F 3/00* (2006.01)
*G06F 9/44* (2006.01)
*G06F 15/16* (2006.01)

(52) U.S. Cl. ............................ 710/8; 717/168; 709/227

(58) Field of Classification Search .................... 710/2, 710/8–11, 15–19; 717/168, 171–178; 709/217–229, 709/250; 713/1, 2, 100
See application file for complete search history.

(56) References Cited

U.S. PATENT DOCUMENTS 5,689,560 A * 11/1997 Cooper et al. ................ 705/52
6,405,362 B1 * 6/2002 Shih et al. ................. 717/174

6,466,981 B1 * 10/2002 Levy ........................ 709/227

(Continued)

FOREIGN PATENT DOCUMENTS

JP     08-054952    *  2/1996

(Continued)

OTHER PUBLICATIONS

The Traveler's Guide to Columbia Network Access, Aug. 15, 2001.*

(Continued)

*Primary Examiner*—Donald Sparks
*Assistant Examiner*—David Martinez
(74) *Attorney, Agent, or Firm*—Pate Pierce & Baird

(57) ABSTRACT

A software and hardware "kit" provides users the ability to seamlessly connect to local area networks at temporary accommodations and remote locations. The "kit" provides the end user with the ability to install wireless network interface cards on a computer, while bypassing the standard "Plug and Play" process, and provides the system configuration necessary to enable the hardware functionality. This will also allow the end user to immediately connect to the local area network, such as a wireless local area network, provided that the user's system is physically located within signal range. This process may be accomplished without the requirement that hardware actually be present and without rebooting the computer system, thus providing a novel improvement over the standard "Plug and Play" process.

13 Claims, 19 Drawing Sheets

U.S. PATENT DOCUMENTS

| | | | |
|---|---|---|---|
| 6,604,237 B1 * | 8/2003 | Giammaria | 717/174 |
| 6,832,230 B1 * | 12/2004 | Zilliacus et al. | 707/203 |
| 6,981,252 B1 * | 12/2005 | Sadowsky | 717/176 |
| 2001/0034846 A1 * | 10/2001 | Beery | 713/201 |
| 2002/0019934 A1 * | 2/2002 | Ishizaki | 713/164 |
| 2002/0107042 A1 * | 8/2002 | Murnaghan et al. | 455/550 |

FOREIGN PATENT DOCUMENTS

| | | | |
|---|---|---|---|
| JP | 09-319573 | * | 12/1997 |

OTHER PUBLICATIONS

Cyberpixie, cyberPIXIE Driver Install brochure, 2 pages.

Boingo Wireless—The Nation's Easiest-To-Use Wi-Fi Internet Service Provider, http://www.boingo.com/, 1 page.

Symantec, Norton Antivirus Software, Internet Security Firewalls, Downloads, Virus Updates and m . . . , http://www.symantecstore.com/dr/sat3/ec_Main.Entry?SP=10007&SID=27674&CID=0 . . . , 1 page.

* cited by examiner

MOBILE, SEAMLESS, TEMPORARY, WIRELESS NETWORK ACCESS APPARATUS AND METHOD

RELATED APPLICATIONS

This application claims priority to U.S. provisional patent application Ser. No. 60/317,483 entitled APPARATUS AND METHOD FOR PROVIDING LOCAL WIRELESS ACCESS TO A GLOBAL COMPUTER NETWORK filed on Sep. 5, 2001, provisional patent application Ser. No. 60/339,153 entitled SEAMLESS DRIVER INSTALLATION APPARATUS AND METHOD filed on Nov. 30, 2001, and provisional patent application Ser. No. 60/361,378 entitled MOBILE, ENVIRONMENTALLY-HARDENED, WIRELESS ACCESS POINT filed on Mar. 1, 2002.

BACKGROUND

1. The Field of the Invention

This invention relates to providing access to global computer networks and, more particularly, to novel systems and methods for providing wireless and wired access to global computer networks.

2. The Background Art

As appreciated by those of skill in the art, known systems for providing high speed access to global computer networks (e.g., the Internet) at temporary accommodations, such as hotels, motels, and the like typically require the installation of expensive and complex infrastructure (e.g., hardware and software). For example, many temporary accommodations spend immense amounts of money installing expensive infrastructure including routing network cable to various rooms, installing network hardware, and the like, to provide high speed Internet as well as other network services to their customers. Not only is the installation of the infrastructure very expensive, but the infrastructure may become obsolete in a very short time, requiring the owners of the accommodations to reinvest in new hardware and software.

Moreover, temporary accommodations may be unable to recoup the money spent on the initial investment to install network hardware. For example, many customers of temporary accommodations such as hotels, motels, and conference centers may be unwilling to pay a premium for network services. Furthermore, current systems may be too inconvenient and may not easily permit a customer to tie into a hotel's network. For example, many business travelers may carry laptops or other computing devices. To connect to a network, a business traveler or other occupant may be required to reconfigure their computer system, such as network settings, hardware, or the like, as well as troubleshoot their system before they can connect to and use a temporary accommodation's network. This may require too much time, effort, support personnel, and the like, to make the services worthwhile to a guest at a temporary accommodation.

Moreover, not only are convenient network services needed at temporary accommodations such as hotels and motels, but at any event or remote location. For example, remote sites used for oil and gas exploration, logging, mining, military installations and exercises, cruise ships, airplanes, construction sites, coast guards, truck stops, or any other mobile or remotely located group may benefit by having access to the Internet and other network services. Likewise, events such as fairs, sporting events, conventions, pow-wows, trade shows, and the like, may lack access to modem communication lines, services, and the like, and may likewise benefit by having access to the Internet and network services. However, factors such as cost, inconvenience, personnel requirements, and the like, may render providing Internet access and network services impractical. Nevertheless, if inexpensive and convenient services could be provided, remote sites and events such as those mentioned may benefit from these services.

What is needed is apparatus and methods to provide consumers with convenient access to the Internet and other network services at temporary accommodations, remote locations, and events.

SUMMARY OF THE INVENTION

A primary object of the present invention is to provide systems and methods for providing Internet and local area network access to users at temporary locations, remote locations, events and the like. For example, in one embodiment in accordance with the present invention, customers or users at temporary accommodations, such as hotels, motels, convention centers, schools, airports, and the like may be provided a kit by a network access provider. The kit may be designed to provide a convenient and seamless method for users to temporarily connect to a local area network providing Internet access at a use site, while eliminating many problems typical of connecting to a local area network.

In certain embodiments, the kit may include network hardware, such as a wireless network interface card (N.I.C.), or a hard-wired network interface card to act as an interface between a computer and a local area network. This network hardware may be temporarily used by the user at a selected location until network access is no longer needed. The kit may then be returned to the network access provider corresponding to the use site when network services are no longer needed. The kit may include a computer-readable media, such as a CD-ROM, floppy disk, flash memory, or other readable media that may include software operable on the computer of the user.

In certain embodiments, the software in accordance with the present invention may be programmed to enable a "hot" insert of the network hardware to the user's personal computer, while bypassing various time-consuming steps typical of hardware installation on a personal computer. For example, software included with the kit may enable the user to install a wireless network card, or other network interface hardware, without rebooting the computer. In addition, full functionality of the hardware may be provided to the user while eliminating the need to step through the "Plug and Play" process. Thus, significant time may be saved to those desiring to connect to a computer network. This may be particularly important with certain customers, such as business travelers, who may have very little time to devote to connecting to a network, troubleshooting their personal computer, and the like.

The kit previously mentioned may be provided to the users in a case. The case may be used to couple the network hardware and the readable media into a unitary structure for delivery to a user. In addition, the case may provide a convenient method to provide instructions to users, protect the hardware and software, aid in tracking inventory, and prevent loss and theft of the contents thereof.

It is a further object of the invention to disclose a method for providing network access to users at a temporary location. For example, a method to provide network access at a temporary location may include providing a kit by a user at a selected location, such as a hotel, motel, convention center, conference center, business center, school, or like location or event. As previously disclosed, the kit may include hardware, software, or a combination thereof to enable the user to connect a computer to a local area network at the selected location.

The kit may be installed, by the user, on a computer, such as a laptop. The kit may provide sufficient instructions to the user in order that the user may install the hardware and software included in the kit, respond to various prompts originating from the software, and connect to a local area network is a rapid and seamless manner. Once access to the local area network is no longer needed, the user may return the kit to the provider.

In certain embodiments, a user may be able to specify criterion upon satisfaction which the user computer's original settings may be restored. For example, the user may be prompted by the software to specify a date to disable the temporary network configuration and to restore the original network settings. When the date is reached, the software may automatically restore the user's original network settings.

In certain embodiments in accordance with invention, other apparatus and methods may provide network, including Internet access, to a user at temporary or remote location. For example, wireless portable "kiosks" or self-contained networking systems may be distributed throughout a business or other premises to provide Internet access, or other network services, to users. These "kiosks" may be useful to provide Internet access to users at malls, airports, schools, convention centers, hotel lobbies, shopping centers, and the like. The portable kiosk may be equipped with wheels or other transport means to easily move the kiosk from site to site depending on pedestrian traffic, demand, space, or like variables. A use site may be equipped with access points at various locations to wirelessly communicate with the kiosks. Alternatively, the kiosks may be used with hare-wired networks. For example, a kiosk may simply be plugged into a wired outlet at different locations at a use site 31. The portable kiosks may further include one or a plurality of user stations where a user may access the Internet. These user stations may be dumb terminals, personal computers, or ports where laptops or other computing devices may be connected.

In other embodiments, an apparatus for providing Internet access to users at a remote locations may be accomplished by providing a mobile, environmentally-hardened access point, providing a gateway to the Internet and other network services. Thus, a local area network may be established at any remote location. For example, a mobile two-way antenna, such as a mobile satellite dish, may be configured to establish a communication link with a satellite, a communications tower, or an airborne communications node, to provide access to the Internet. An access point may be operably connected to the mobile two-way antenna to provide a gateway for a wireless network. This access point may provide local area network services, as well as Internet access, to a plurality of wireless or wired nodes at the remote location. In other embodiments, the mobile access point may be configured to act as a repeater to link other ground based or airborne wireless networks.

BRIEF DESCRIPTION OF THE DRAWINGS

The objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 7b is a flow chart illustrating additional detail of step 124 described in FIG. 7a;

DETAILED DESCRIPTION OF THE PREFERRED EMBODIMENTS

It will be readily understood that the components of the present invention, as generally described and illustrated in FIGS. 1 through 19 herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

Figure 1:
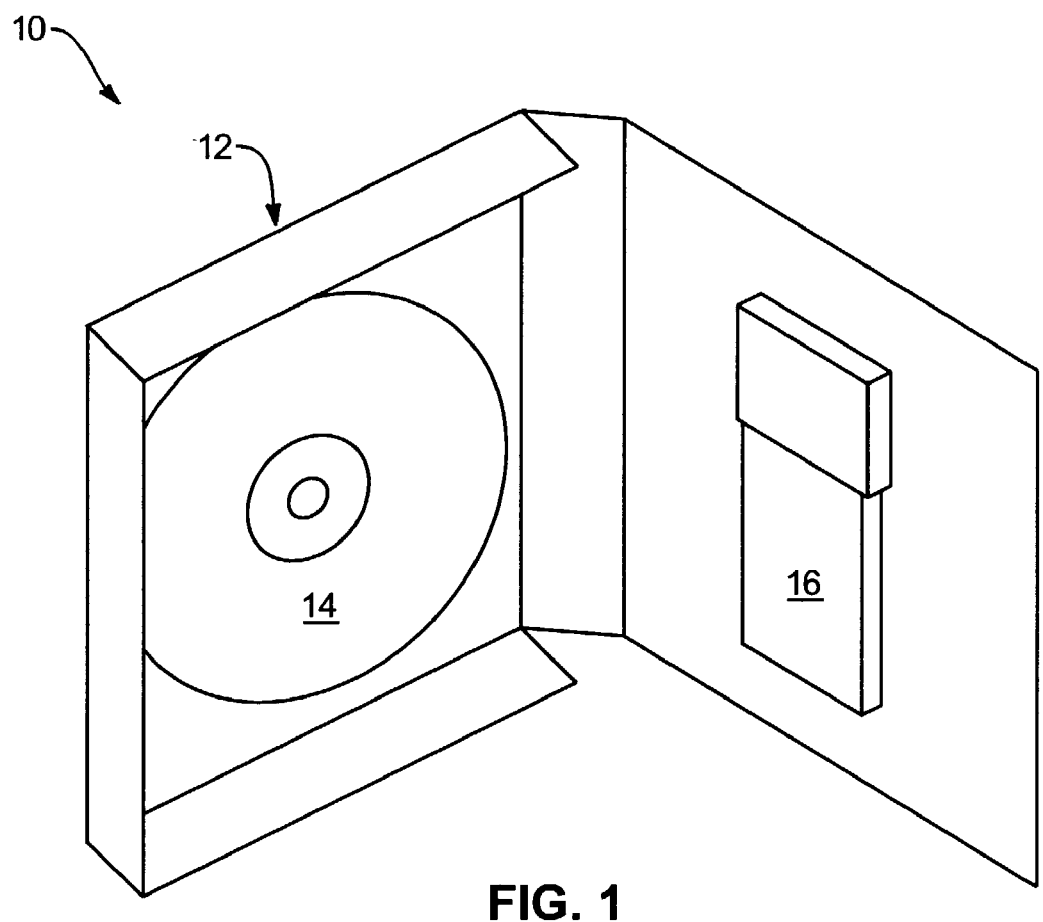
FIG. 1 is a perspective view of one embodiment of a hardware and software "kit" in accordance with the invention.
Figure 2:
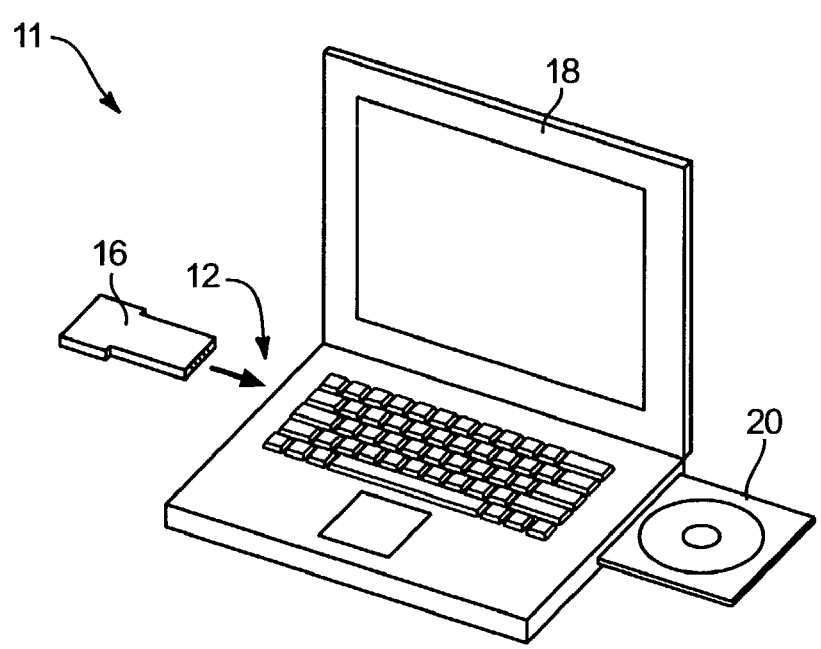
FIG. 2 is a perspective view of one embodiment of installing the kit of FIG. 1 on a personal computer.
Figure 3:
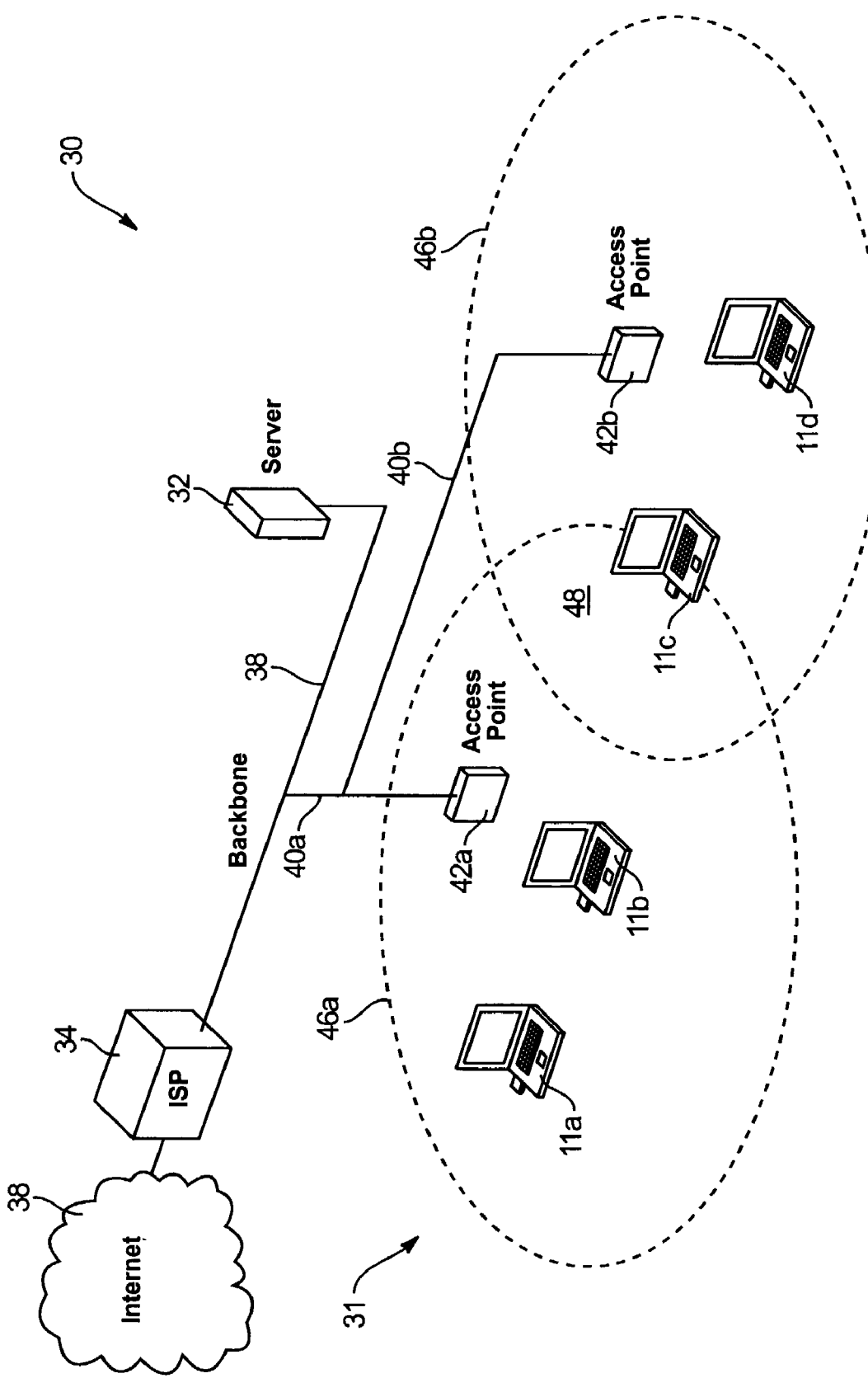
FIG. 3 is a schematic block diagram of one embodiment of a wireless local area network.

Referring to FIGS. 1 through 3, in selected embodiments, a kit 10 may be provided by a network access provider to users arriving at a use site 31 to connect to a local area network 30 at the use site 31. The kit may be installed on a computer 11 controlled exclusively by a guest or other user to connect to the local area network 30. Use sites 31 may include hotels, convention centers, schools, government offices, business offices, trade shows, or remote locations used for mining, drilling, logging, the military, and the like. The local area network 30 may provide any of numerous services, including but not limited to Internet access, applications, data, or entertainment services, such as audio and video material, voice over Internet protocol, telephony, information, news, and any other content or services capable of being provided via a local area network 30. In certain embodiments, the services provided may be tailored to a particular geographical region or may be modified according to a particular logical network address of a user connecting to a network 30.

In selected embodiments, the kit 10 may include a network interface card 16 to interface a computer 11 of a user to a local area network 30 controlled by the network access provider. The network interface card 16 may be compliant with any of a variety of local area network technologies including but not limited to ethernet, token ring, and appletalk. The network interface card may be wireless, or if desired, a hard-wired version may be supplied. In addition, the kit 10 may also include computer-readable media 14, such as a CD-ROM, a floppy disk, flash memory, a hard disk, or DVD, containing software for installing the network card 16, as well as other software, on the computer 11. The software may be effective to support a hot insert of the network interface card to the computer 11. By hot insert, it is meant installing hardware 16 into the computer 11 during use without requiring a user to reboot the computer 11 or process through detection systems for detecting new hardware introduced into the computer 11, such as the "Plug and Play" process.

The kit 10 may also include instructions effective to support loading of the software 14 and installation of the network interface card 16 in the computer 11 of a user. In certain embodiments, the instructions may be printed separately from the network interface card 16 and computer-readable media 14, on the network interface card 16, on the computer-readable media 14, or on a hard copy medium distinct from the network interface card 16 and the computer-readable media 14. In certain embodiments, the instructions may be embodied as an electronic file in the computer-readable media 14. The instructions may be readable by a user directly in the native language of the user. In other cases, the instructions may be provided orally by a representative of the network access provider.

In selected embodiments, the network interface card 16 and the computer-readable media 14 may be provided to a user in a case 12. The case may assist in protecting the hardware 16 and software 14, tracking inventory, preventing loss and theft of the contents thereof, and provide an appealing presentation. Instructions for using the kit 10 may be printed directly on the case 12, or the case 12 may include a sheath receptive to an instruction insert. The case may include any of a variety of clasps or other engagement means to engage at least one of the network interface card 16 and the computer readable media 14.

Referring more specifically to FIG. 3, the kit 10 may be provided to a plurality of users 11 arriving at a use site 31 to connect to a local area network 30 at the use site 31. The users 11 may install the kit 10 on their respective computers 11 in order to connect to the network 30. For example, a local area network 30 may include a backbone 38 that may be linked to an Internet service provider 34 providing access to the Internet 38. The backbone 38 may include other network hardware such as firewall, routers, and the like. The local area network 30 may include a server 32 for providing network services to other nodes 11 on the network 30.

The local area network 30 may also include one or a plurality of access points 42*a*, 42*b*, distributed across the use site 31. The access points 42 may provide wireless access to the local area network 30 to nodes 11 located within an effective radius 46*a*, 46*b* of the access points 42. Likewise, each of the nodes 11 may include wireless network cards 16 for communicating with the access points 42. In some instances, regions 48 of overlap may create areas 48 of interference between each access point 42*a*, 42*b*. Thus, users 11 may arrive at a use site 31 with laptops 11 or other computing devices 11 and connect to a local area network 30, provided by a distinct entity, and connect thereto using a kit 10 using minimal effort and eliminating the need to personally configure their computers 11.

Figure 4:
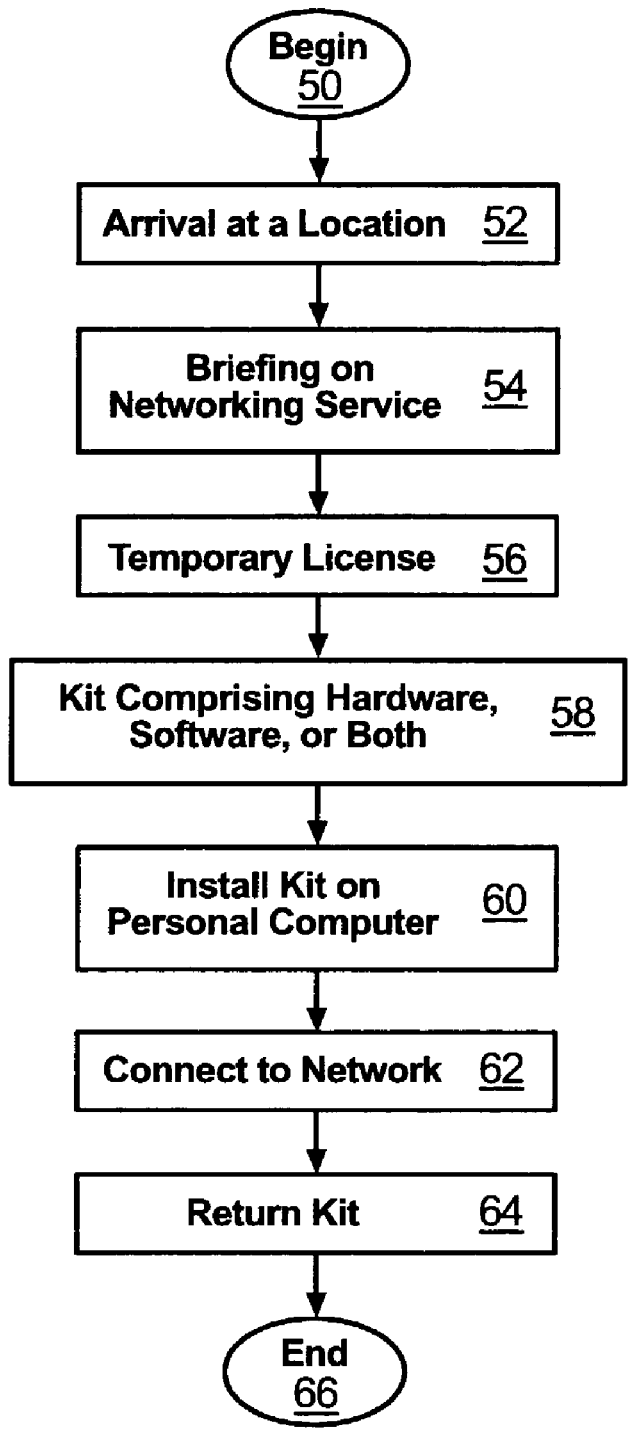
FIG. 4 is a flow chart of one embodiment of a method for providing network access in accordance with the invention.

Referring to FIG. 4, a process 49 for connecting to a local area network 30 provided at a use site 31 may include arriving 52 at a location having a local area network 30 and a number of kits 10. Upon arrival, a guest or other user may be briefed 54 or advised 54 of the existence of the network 30. This may be done by a representative of the network service provider or may be advertised using written or other visual materials. The guest of user may then be asked to sign a temporary use license to use the kit 10. The user may then be provided a kit 10 including hardware 16, software 14, or a combination thereof. In some cases, a user may already own a wireless network interface card 16 and may only need the software 14. In other instances, the user may already have the software 14 installed on a computer 11 and may only need a kit 10 containing the necessary hardware 16.

The contents of the kit 10 may then be installed on the computer 11 of the user, after which the user may connect 62 to the network 30. Once the user no longer needs access to the network 30 (e.g. the user leaves the use site 31) the user may return 64 the kit 10 to the network access provider.

Figure 5:
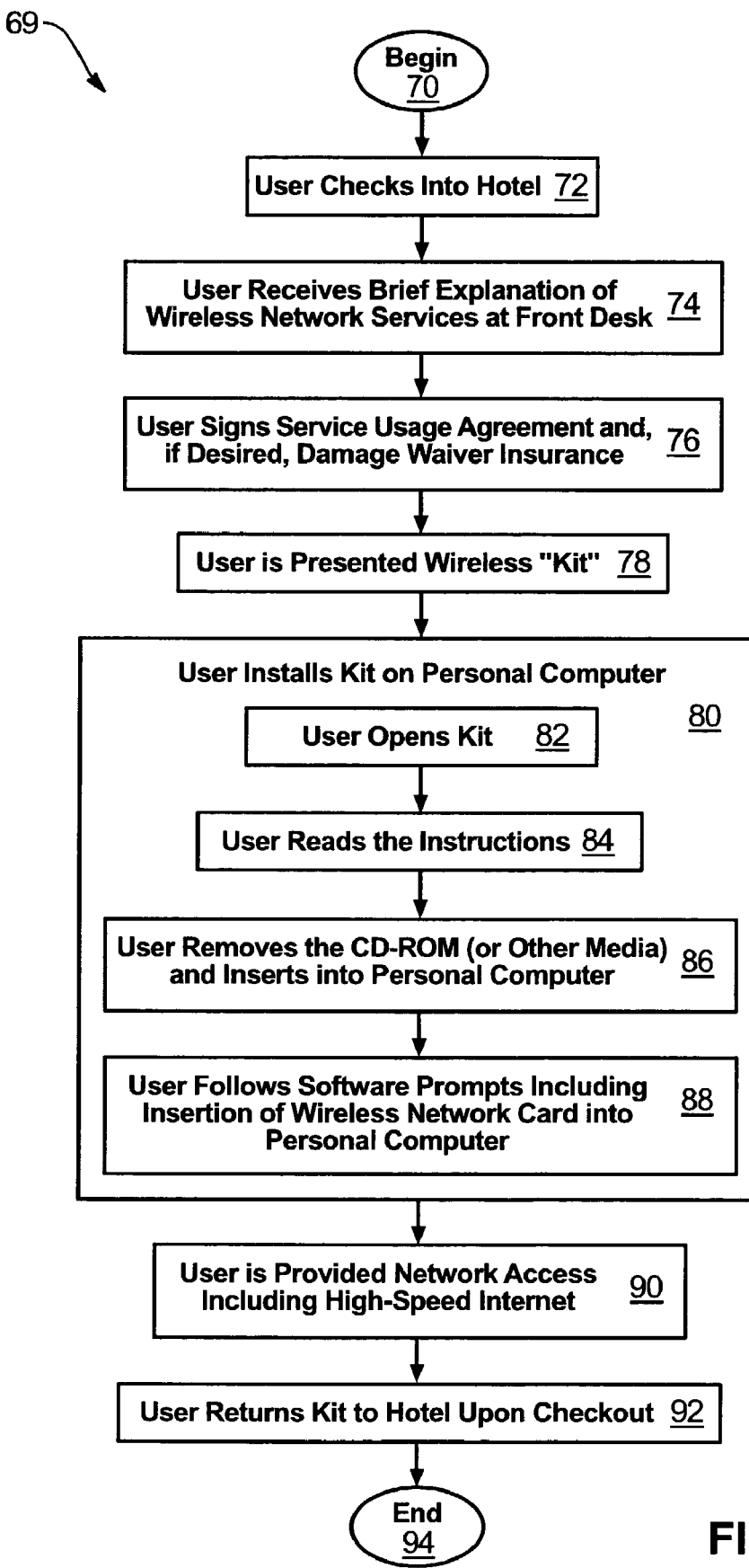
FIG. 5 is a flow chart of one embodiment of a method for providing network access at a temporary accommodation in accordance with the invention.

Referring to FIG. 5, for example, in one embodiment a user may check 72 into a hotel having a local area network 30. The hotel may have any of various educational materials at its front desk to advertise of available network service including front desk plaques, brochures, business cards, posters, fliers, and the like, describing the network services offered.

After a guest registers, a guest may receive 74 a brief explanation of the wireless networking services by a front desk clerk or other employee to inquire if the guest needs Internet access or other network services. The front desk clerk or other employee may show the guest any of the various educational materials. The front desk personnel may explain that the network services may be used anywhere on the use site 31.

If the guest is interested in using the provided services, the guest may sign 76 a service usage agreement agreeing to purchase the network interface card 16 if damaged or stolen. The service usage agreement may specify that the guest is responsible for returning the card in good working condition. At this point, the hotel representative may offer an insurance package to indemnify the guest against card damage. This insurance package may be offered to the guest for a fee.

The hotel representative may then deliver a kit 10 to the guest. Once the guest has received the kit 10, the user may open 82 the kit and read 84 any instructions provided therewith. The user may then remove 86 the computer readable media 14, such as a CD-ROM, and insert 86 the media 14 into the user's computer 11. The software 14 installed on the computer readable media 14 may then be configured to begin the installation process automatically. The software 16 may prompt 88 the user to for various inputs until the software 14 is installed. The software 14 may also prompt 88 the user to physically insert the wireless network card 16 into a slot on the computer 11.

Optionally, between the insertion step 86 and the step 88, a step may be included for the software 14 to automatically verify that a computer-readable media 14 is an authentic copy and not an unauthorized copy. For example, the software 14 may include a step to verify that a sector layout of the computer readable media 14 is identical to the sector layout of a master copy. Unauthorized copies may include the same logic as an authorized copy. However, unauthorized copies may inaccurately duplicate the sector layout of authorized versions. This step may help frustrate the creation of unauthorized copies and may be more effective than traditional methods at preventing unauthorized duplication.

After the software installation process has completed and the wireless network interface card 16 has been inserted into the computer 11, the user may be automatically connected to the Internet 38 by way of the local area network 30. After the user has used the network services and is ready to leave the use site 31, the kit 10 may then be returned 92 to the hotel upon checkout.

Figure 6:
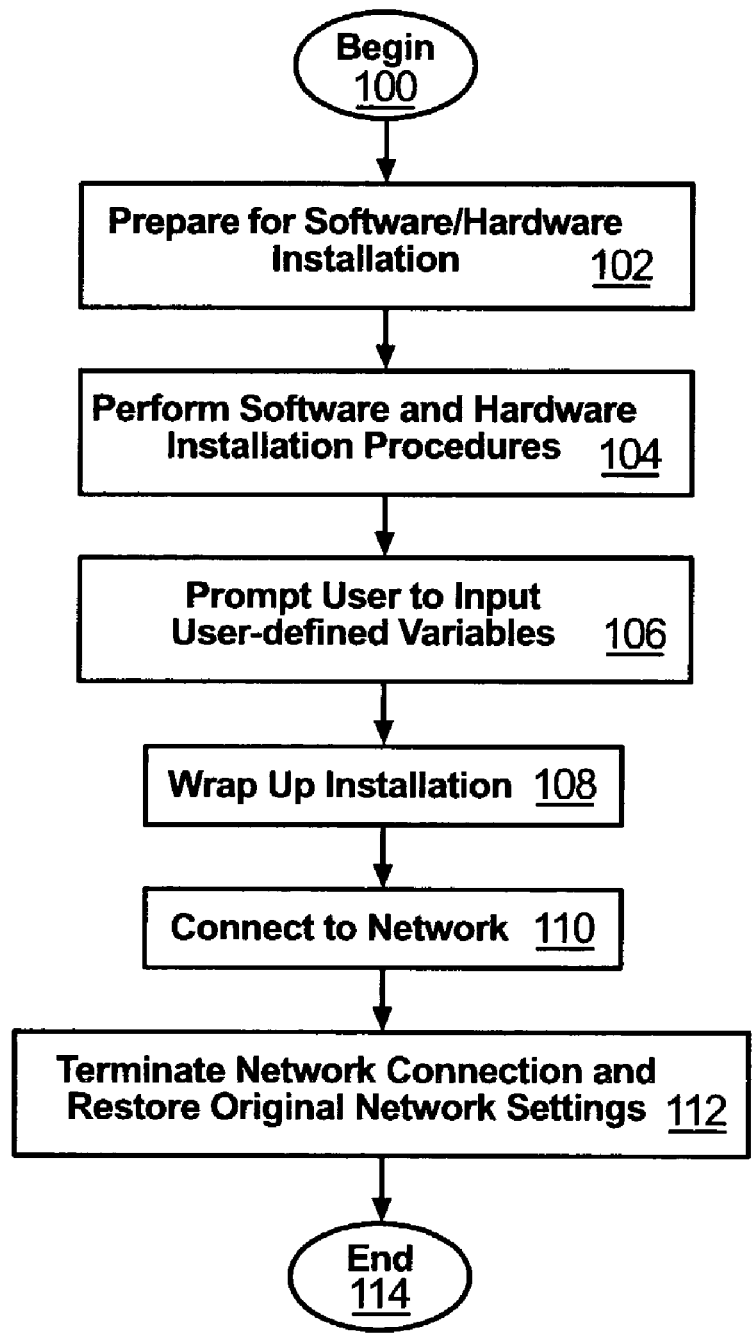
FIG. 6 is a flow chart of one embodiment of a method for seamlessly installing the functionality for network interface cards in accordance with the invention.

Referring to FIG. 6, a general process 99 followed by the software 14 in accordance with the invention, may include preparing 102 a computer 11 for the software or hardware installation. This may include steps, such as prompting a user to initiate the installation, agreeing to a license agreement, or the like. The preparation step 102 may be followed by the actual installation 104 of necessary hardware 16 and software 14 to provide the functionality to connect to the network 30. During the process 99, the user may be prompted to input values for various variables. For example, a user may be prompted to input the amount of time he or she wishes to use the software 14.

The process 99 may continue by wrapping up 108 the software 14 installation process 104. Once the installation process 104 is finished, the software 14 may begin functioning by automatically connecting 110 to a network 30. In other embodiments, the connection step 110 may occur between the installation step 104 and the prompting step 106. Alternatively, the connection step 110 may not be automatic, but initiated by a user. Once a user has finished using the services provided by a network 30 and he or she wishes to disengage from the network 30, the process 99 may continue by terminating 112 the network connection and restoring 112 the original network settings of the computer 11.

Figure 7A:
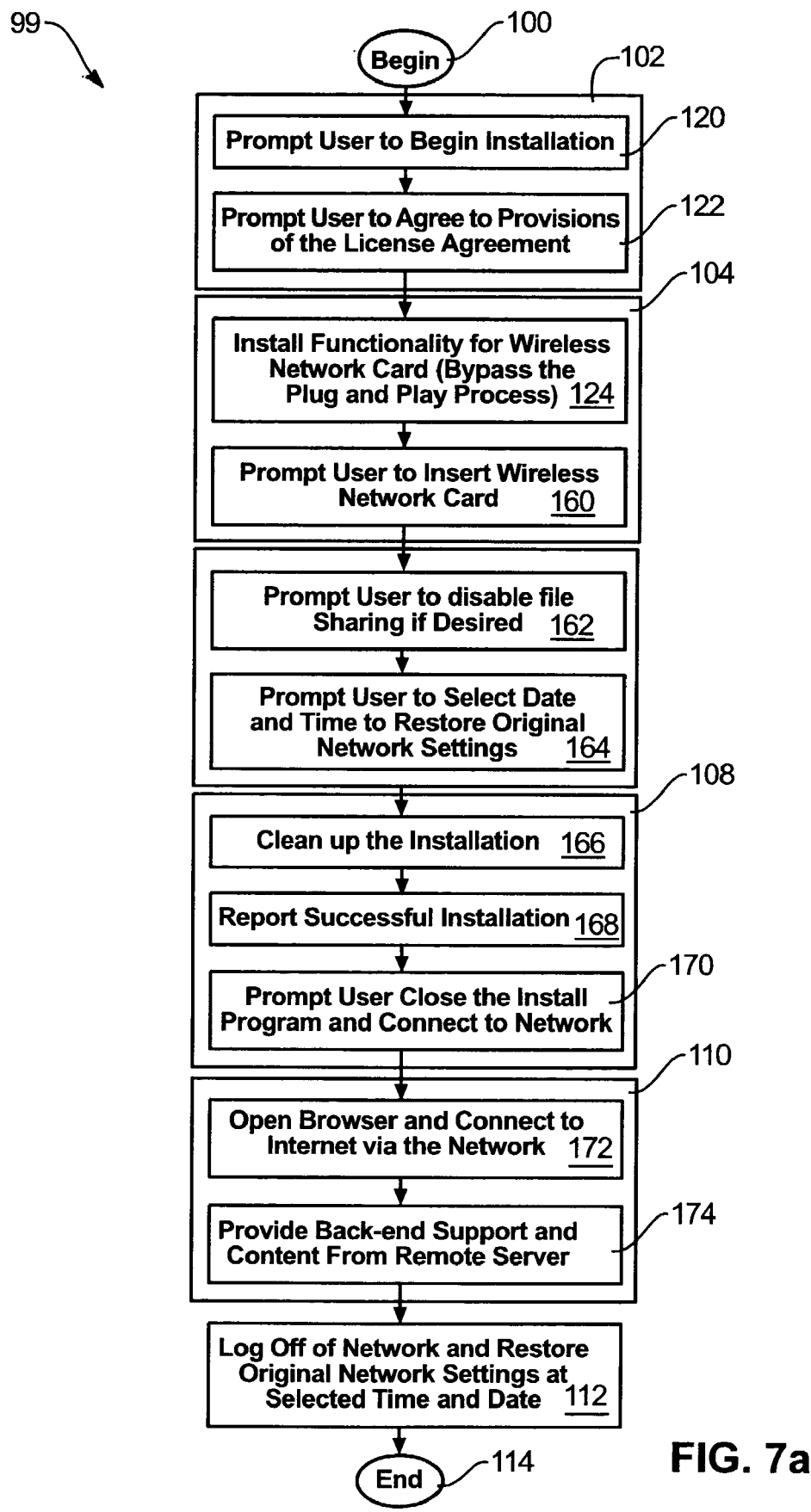
FIG. 7a is a flow chart illustrating additional detail to the flow chart of FIG. 6 of a method for seamlessly installing the functionality for network interface cards in accordance with the invention.
Figure 7B:
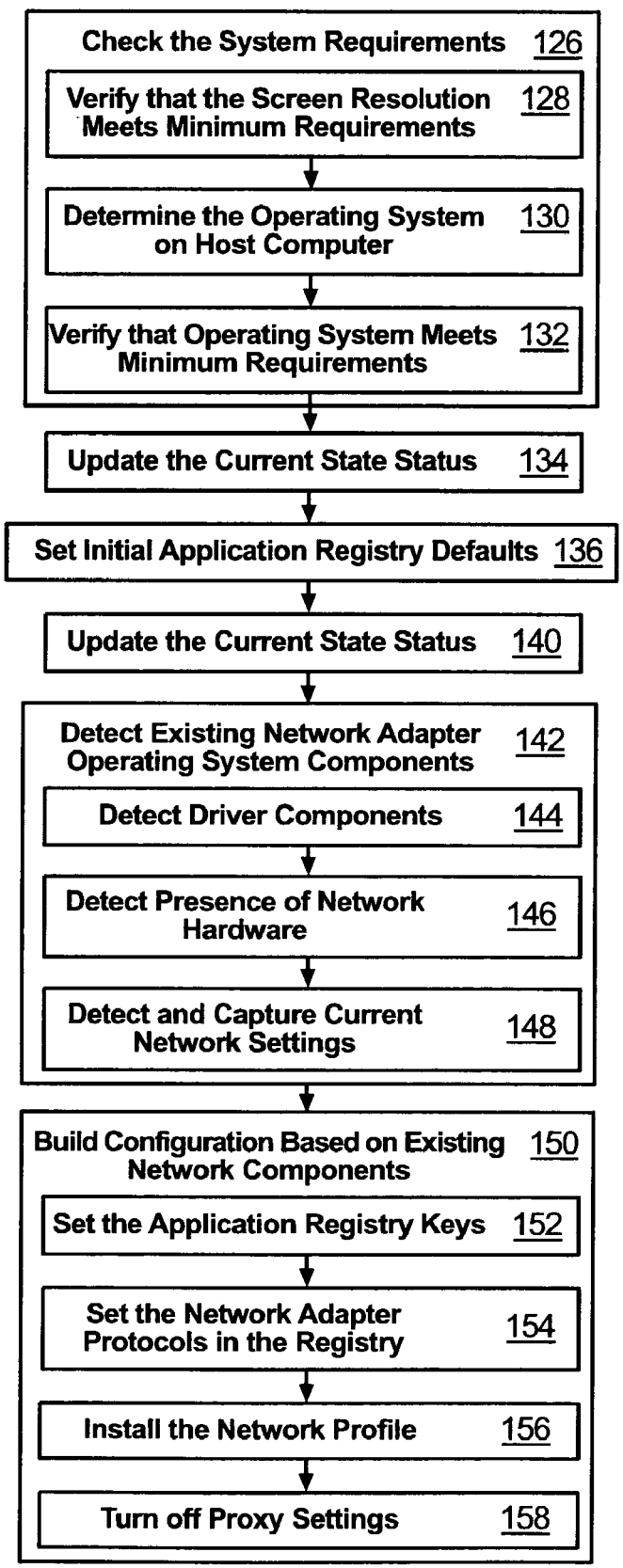

Referring generally to FIGS. 7*a* and 7*b*, the "Plug and Play" specification may be inadequate in many aspects. For example, in many cases, when new hardware is added to a computer system, a window may appear on a user's computer screen notifying the user that the computer has detected new hardware. In some instances, a user may be confused by the appearance of these windows. In some cases, a user may be required to provide additional system configuration settings. Often, the user may be required to install additional operating system components. A user may or may not have these components at his or her disposal.

Therefore, in accordance with the invention, a software installation method 99 may be configured to install necessary drivers without requiring that a user have the operating system CD. Additionally, the installation of the software may install the drivers such that they are fully functional without requiring a system reboot and without requiring that a user manually input system configurations or settings. As a result, very little interaction and no intervention may be required of a user for the system 11 to function.

For example, a user may only be required to insert computer readable media 14 containing software implementing a process 99 in accordance with the invention. The process 99 may then automatically configure the system 11, while bypassing the "Plug and Play" process. In certain embodiments, the process 99 may automatically identify and store original system settings. When the user has finished using the software 14 and no longer requires use of the network 30, the process 99 may restore the original setting to the computer 11.

Using the process 99, drivers may be installed without user intervention, and may be done prior to the insertion, or presence of the network interface card 16 in the computer 11. In certain cases, such as when installing the software 14 in operating systems, such as Windows 2000 or Windows XP, the drivers may already be present on the system 11. These may simply be enabled by the process 99 in accordance with the invention. Alternatively, if the process 99 identifies that a newer version of a driver is available, these may be installed by the process 99. The process 99 may also have the capability to install all of the hardware functionality prior to physically inserting the actual network interface card 16. Thus, when the hardware is physically inserted, the functionality of the hardware may be automatically enabled.

The process 99 may be very important to the value of the software 14 perceived by a user, as many users may expect to use the hardware capabilities within in a very short time frame. For example, in certain situations, a user may expect to receive a kit 10 and have access to network 30 and Internet 38 services in a very short time. This may be impossible using the standard "Plug and Play" process. For example, when an audio CD is inserted into a CD-ROM drive on a computer system 11, a user may expect the music to automatically begin playing by pressing "play" button. A process 99 in accordance with the invention may provide this same level of functionality and convenience.

A process 99 in accordance with the invention may configure a system 11 without requiring that any settings be entered by a user. Thus, the process 99 may be configured to completely manage the system configuration. The process 99 may require that a user enter a time and date to restore a computer's original settings or if a user would like to launch an Internet browser to begin browsing the Internet 38. However, these user inputs do not affect the configuration of the system 11.

Software 14 used to implement a process 99 in accordance with the present invention may be distributed on a CD or DVD. In addition, the memory requirements of the software 14 may be small enough that it may be distributed on a floppy disk (1.44 MB). Other forms of computer-readable media may also be used such as wireless, solid state, or other mass storage devices.

Power management control may be configured by a process 99 in accordance with the invention before a network interface card 16 is physically inserted. This step may be necessary to bypass standard "Plug and Play" procedures. If power management is not controlled, the system 11 may not understand what hardware is available, and as a consequence, may not be able to use it. A process 99 in accordance with the invention may be configured to manage this aspect of the hardware 16. In addition, a process 99 may be configured to install protocol registry entries 152, 154 and turn on specific registry keys 152, 154. This may be performed to supply power to the adapter 16 (or other hardware).

The process 99 may be used to provide the user with a seamless network connection. Without any manual user configuration, the process 99 may accelerate the time needed to connect to a network 30, such as a wireless network 30. For example, DHCP may be automatically configured by the process 99 to obtain an address on a local area network 31 and scan for appropriate channels on an access point 42. Manually configuring a system 11 to provide these features may be very time consuming. In addition, a process 99 in accordance with the invention may be compatible with a wide variety of operating systems, including but not limited to Windows, Windows NT, Linux, Unix, and Macintosh operating systems. In addition, a process 99 may be completely independent of the operating system or hardware used by a computer 11.

For example, Referring more specifically to FIGS. 7*a* and 7*b*, one embodiment of a process 99 in accordance with the invention may include prompting 120 the user to begin installation after the computer-readable media 14 has been inserted into the computer 11. Once the user has agreed to install the software 14, the software may prompt 122 the user to read and agree to abide by a license agreement. After the user has completed the licensing step 122, the process 99 may bypass the "Plug and Play" process and install 124 the functionality for the network interface card 16.

Referring specifically to FIG. 7*b*, installing 124 the functionality for the network interface card 16 may include checking 126 the system requirements of a computer system. Checking 126 may include verifying 128 that the screen resolution meets the minimum requirements, determining 130 the operating system running on the computer system, and verifying 132 the version of the operating system to see that it meets minimum system requirements.

The current state status may be updated 134 and initial application registry defaults may be set 136. The current state status may again be updated 140 and pre-installed network adapter operating system components may be detected 142. Detecting 34 network adapter operating system components may include detecting existing wireless network interface card drivers and settings 144. This may include detecting the presence of network hardware 146, driver version, default and current configuration profile settings, DHCP settings, and capturing the current network protocol settings 148.

In addition, the detection step 142 may be configured to detect and backup browser settings such as proxy settings and whether or not they are enabled, browser dial-up settings such as a setting to never dial a connection, dial whenever a network connection is not present, always dial a default connection (when using Internet Explorer), and offline settings (when using Netscape). In addition, the step 142 may detect the operating system's default browser, which can be launched at the end of the install, and also detect whether file and printer sharing is enabled (which may be a potential security issue on a wireless local area network).

Based on the components and settings that are detected 142, setup options may be configured 150 accordingly. For example, application registry keys may be set 152, network adapter protocols in the registry may be set 154, a network profile may be installed 156, and proxy settings may be turned off 158.

Referring again to FIG. 7*a*, a user may be prompted to physically insert 160 a network interface card. The software 14 may then prompt 162 the user to disable file sharing while the user is temporarily connected to the network 30. Thus a user's files may be made inaccessible to other users on the network 30. In addition, the user may be prompted 164 to select a date and time to restore a user's original network settings. In actuality, any criterion may be selected to trigger the restoration 112 of a user's original network settings including a time of day, a date, an event, a status of the user's computer 11, a location, a user or computer-generated interrupt, a combination thereof, and the like. When the wireless network access is enabled, a user's computer system 11 may be configured with the necessary settings to enable connectivity to the wireless network 30. When the wireless network access is disabled, the user's system 11 may be restored 112 to the original network and configuration settings based on the components detected 142 during the installation process 124.

The installation process 99 may then be cleaned up 166, such as by releasing memory used during the installation, and closing installation files. The process 99 may then report 168 that the installation is complete and close 170 the install program.

Once the installation has terminated 170, the software process 99 may be configured to automatically launch 172 the browser and automatically connect the user to the Internet 38. In certain embodiments, a remote server may detect that a user has connected to a particular local area network 30 provided by a network service provider. The remote server may provide 174 services and content to a user's computer 11 depending on the logical address of the computer 11.

Once a user no longer requires the services of a local area network 30, the user may disconnect from the network 30 and selectively to choose to restore 112 the original network settings and configuration of the computer 11. Alternatively, as was previously mentioned, a computer's original network settings and configuration may be restored 112 once criterion, established by the user, are satisfied.

Figure 8:
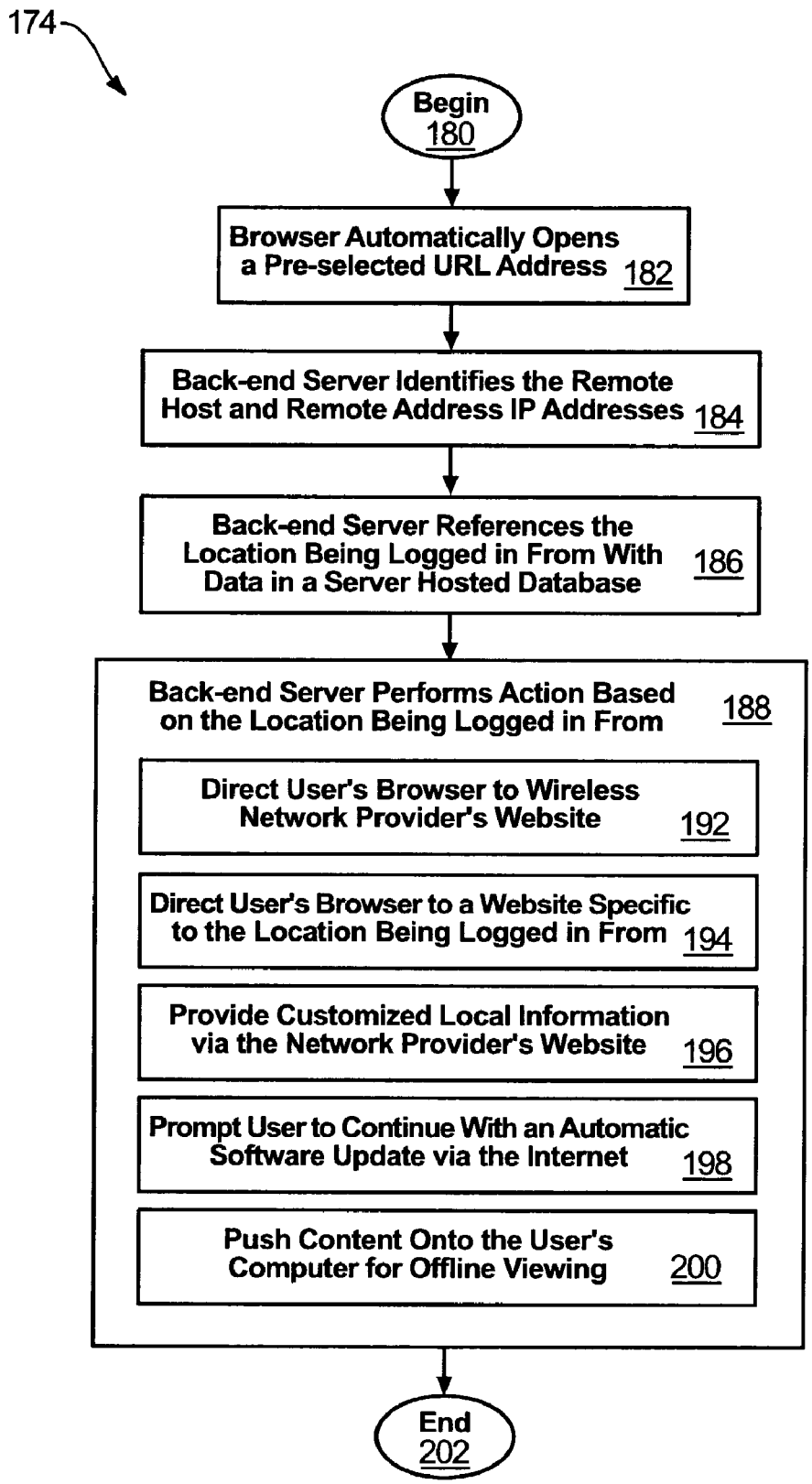
FIG. 8 is a flow chart of one embodiment of a method for providing services from a back-end server to a user connected to a local area network in accordance with the invention.

Referring to FIG. 8, once the software 14 is installed and the user has connected to the local area network 30 and the Internet 38, the browser may automatically open 182 a pre-selected URL address on the Internet 38. For example, the browser may be directed to a web site explaining the features of the software 14. In certain embodiments a back-end server located remotely from the use site 31 may identify 184 the logical address of the local area network 30 in addition to the logical address of the computer 11, or node 11, logging into the network 30. Based on the identified network and node addresses, the remote server may lookup 186 data in a remote database based on the addresses of the node 11. The remote server then may perform 188 several actions based on the addresses.

For example, in certain embodiments, the user may be directed 192 to a website of the installer of the local area network 30. Alternatively, the user may be directed 194 to a web site unique to the network access provider, such as a web site of a hotel, convention center, conference center, business center, school, government office, business office, trade show, or the like, based on the user's logical address. In certain embodiments, the remote server may direct the user to customized information, such as news, weather reports, maps, local information, product catalogues, and the like. In another embodiment, the remote server may automatically update 198 software on the user's computer 11, such as the software 14, by downloading a newer version. In yet another embodiment, the remote server may push 200 content onto the user's computer 11 for offline viewing. These are merely a few examples of many actions that may be performed by a remote server once a computer 11 has connected to the network 30. Additionally, not only may a remote server perform these actions, but also a local server 32 located on the local area network 30.

Figure 9:
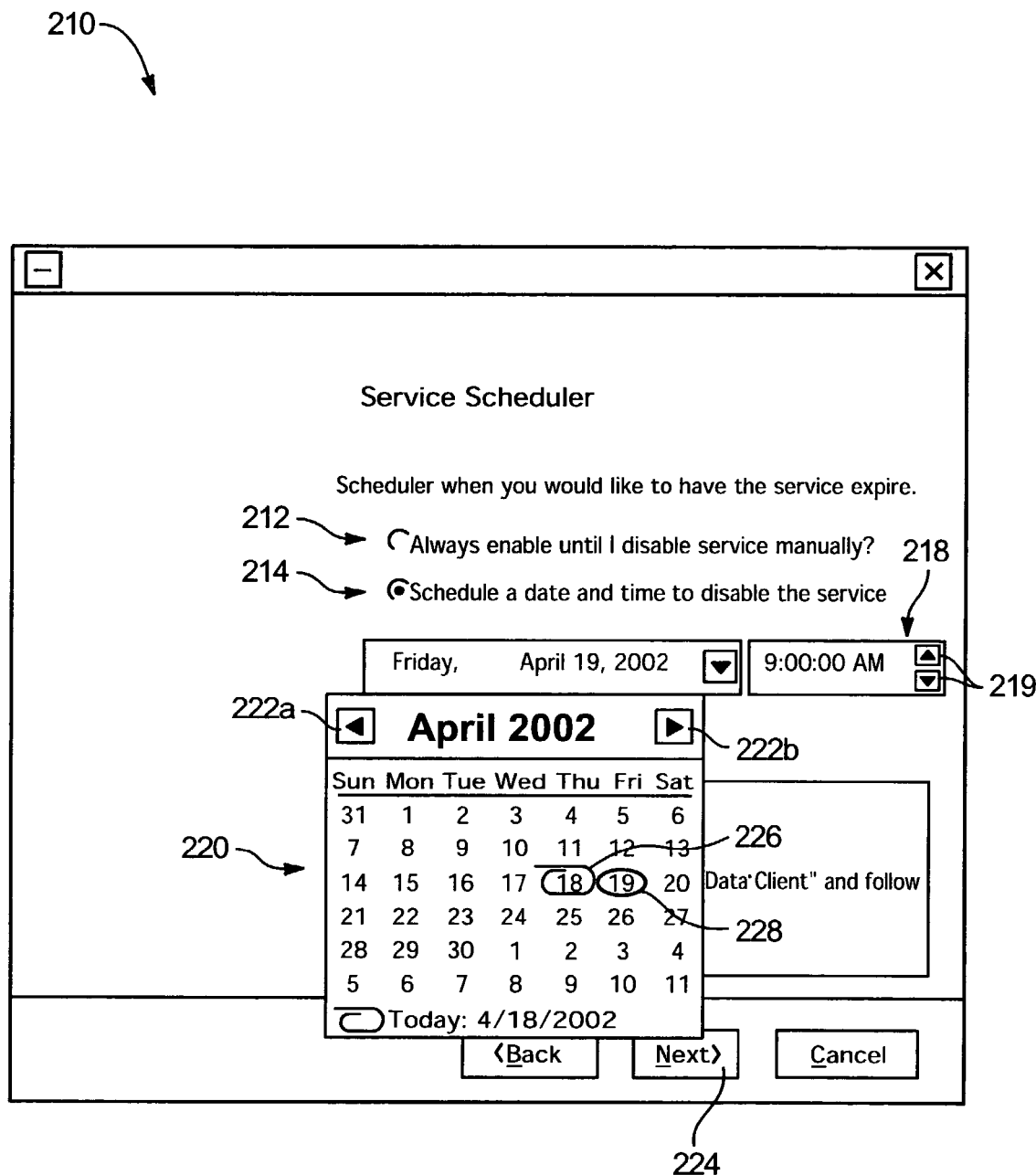
FIG. 9 is a schematic block diagram of one embodiment of a scheduling screen that may be used to schedule the restoration of network settings to a user computer.

Referring to FIG. 9, a service scheduler 210 may provide a user the option to select a date and time to restore a user's original network settings. In actuality, any criterion may be chosen to trigger the restoration 112 of a user's original network settings including a time of day, a date, an event, a duration, a status of the user's computer 11, a location, a user or computer generated interrupt, a combination thereof, or the like.

For example, a service scheduler 210 may provide the user the option to always enable 212 the temporary network settings until the user chooses to manually disable the service. Alternatively, the user may be provided the option to schedule 214 a date and time to disable the service. If this option is selected, in one embodiment, a calendar 220 and a clock 218 menu may be provided to the user to select a time to disable the service. The calendar 220 and clock 218 menus may include scroll buttons 219, 222a, 222b to scroll through the months of the year and times in a 24-hour day, respectively. Once a date and time are selected to disable the service, a confirmation button 224 may permit the user to finish the installation of the software 14. The computer's original network settings may then be restored when the criterion established by the service scheduler 210 are satisfied.

In another embodiment, the service scheduler may be modified in order that a user may toggle between several network configurations. For example, if a user regularly connects to two distinct networks 30, such as at work and at school, he or she may wish to simply toggle between the two configurations, rather than set a date or criterion to disable a temporary configuration. Alternatively, in another embodiment, the service scheduler 210 may be deleted completely. For example, if a user desires to connect to a network 30 in a residential area with a computer 11 not intended to be moved from its location, then appropriate network settings may be permanently established.

Figure 10:
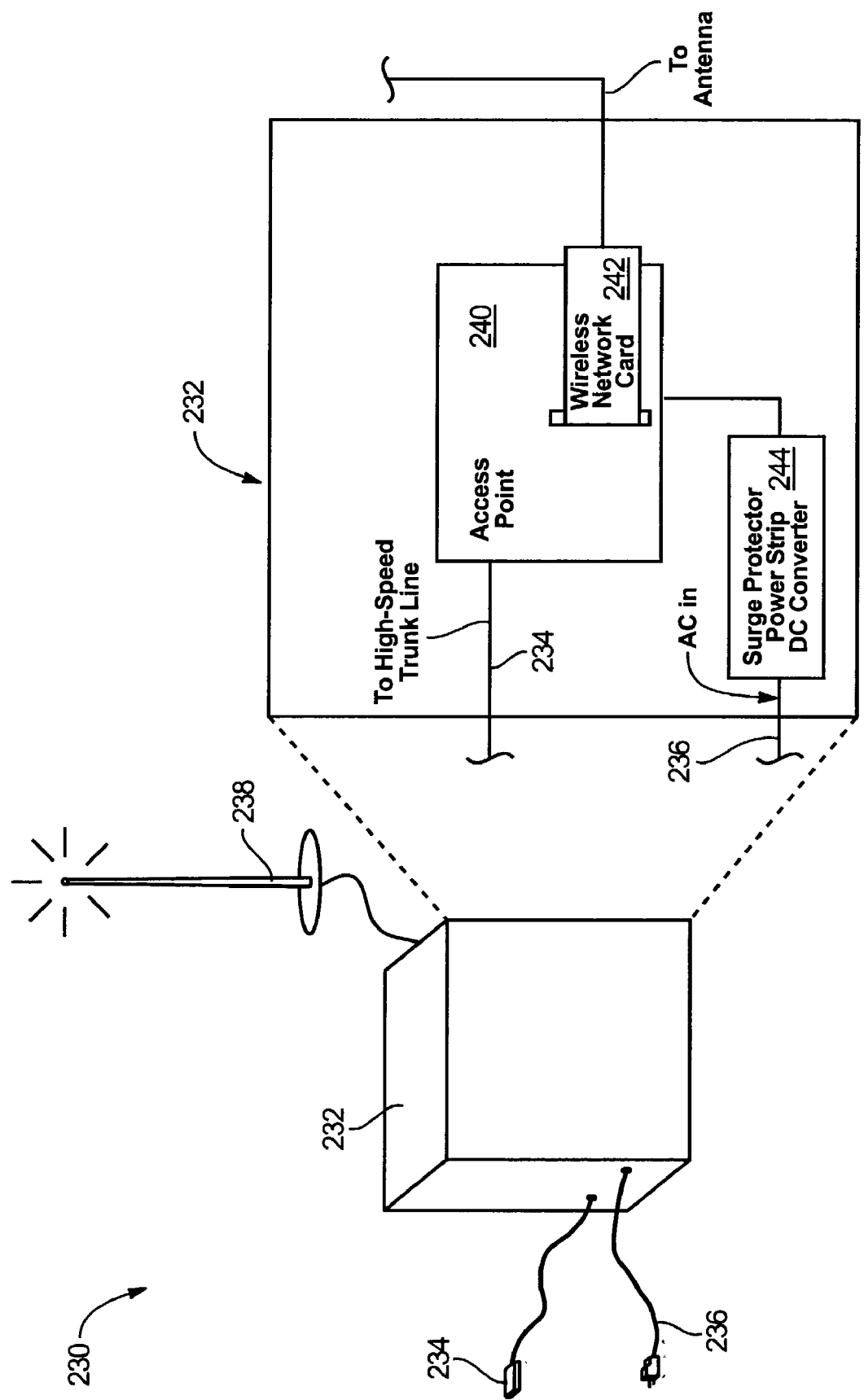
FIG. 10 is a schematic block diagram of one embodiment of a turn-key wireless network that may be provided in accordance with the invention.

Referring to FIG. 10, in selected embodiments, a turn-key, wireless, local area network 230 may be provide to a hotel, convention center, conference center, business center, school, government office, business office, trade show, or the like. Such a system 230 may require very little or no configuration to set up and install. For example, in one embodiment, such a turn-key system 230 may simply include an enclosure 232, housing computer and network components, and an antenna 238.

In certain embodiments, the antenna 238 may by connected to, embodied in, or contained within the enclosure 232. The turn-key network 232 may include a cord 234 or socket 234 to connect to a high-speed trunk line, providing Internet and other services. A cord 236 may be used to provide power to the turn-key network 236. Alternatively, a battery, or a UPS system may be provided within the enclosure 232 to provide power to the network 230. Setup of the network 230 may be as simple as plugging in the power cord 236, connecting the input 234 to a high-speed trunk line, and locating the antenna 238 at an effective location.

The kits 10 described in FIG. 1 may be provided with the network 230 in order to allow users to connect to the network 230. The kits 10 may be provided in virtually any quantity, as needed, and the network 230 may be configured to support any reasonable number of users.

An access point 240 may be provided within the enclosure 232. The access point 240 may incorporate into its function a plurality of computer hardware components to provide a variety of services and functions. The computer hardware components that may be incorporated into the access point 240 are described in more detail in the description of FIG. 11. For example, the access point 240 may interface to a wireless network card 242 and the signal generated therefrom may be output to the antenna 238. The enclosure 232 may also include a surge protector, power strip, and a DC converter to provide power to the various components within the enclosure 232. In certain embodiments power may be supplied to components within the enclosure 232 using wires in an ethernet cable.

Figure 11:
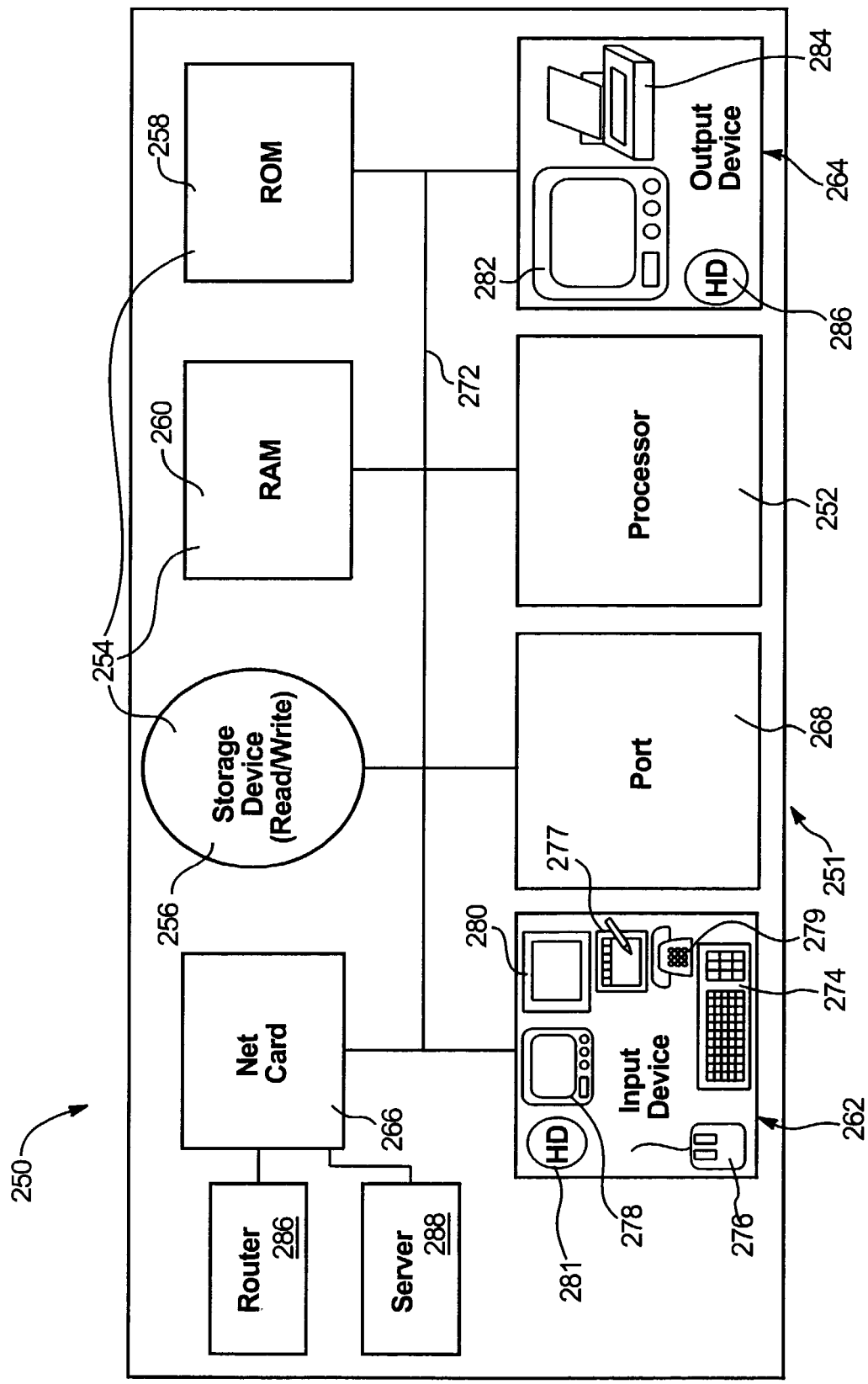
FIG. 11 is a schematic block diagram of one embodiment of computer hardware that may be included in the computer hardware illustrated in FIGS. 10, 13, and 15.

Referring to FIG. 11, an access point 240 may include an apparatus 250 that may implement the invention on one or more nodes 251, (client 251, computer 251) containing a processor 12 (CPU 12). All components may exist in a single node 251 or may exist in multiple nodes 251 remote from one another. The CPU 252 may be operably connected to a memory device 254. A memory device 254 may include one or more devices such as a hard drive or other non-volatile storage device 256, a read-only memory 258 (ROM 258) and a random access (and usually volatile) memory 260 (RAM 260 or operational memory 260).

The apparatus 250 may include an input device 262 for receiving inputs from a user or from another device. Similarly, an output device 264 may be provided within the node 251, or accessible within the apparatus 250. A network card 266 (interface card) or port 268 may be provided for connecting to outside devices, such as another network, router 286, or server 288.

Internally, a bus 272, or plurality of buses 272, may operably interconnect the processor 252, memory devices 254, input devices 262, output devices 264, network card 266 and port 268. The bus 272 may be thought of as a data carrier. As such, the bus 272 may be embodied in numerous configurations. Wire, fiber optic line, wireless electromagnetic communications by visible light, infrared, and radio frequencies may likewise be implemented as appropriate for the bus 272.

Input devices 262 may include one or more physical embodiments. For example, a keyboard 274 may be used for interaction with the user, as may a mouse 276 or stylus pad 277. A touch screen 278, a telephone 279, or simply a telecommunications line 279, may be used for communication with other devices, with a user, or the like. Similarly, a scanner 280 may be used to receive graphical inputs, which may or may not be translated to other formats. The hard drive 281 or other memory device 281 may be used as an input device whether resident within the node 251 or some other node 251 on a remote network.

Output devices 264 may likewise include one or more physical hardware units. For example, in general, the port 268 may be used to accept inputs into and send outputs from the node 251. Nevertheless, a monitor 282 may provide outputs to a user for feedback during a process, or for assisting two-way communication between the processor 252 and a user. A printer 284, a hard drive 286, or other device may be used for outputting information as output devices 264.

In general, a network to which a node 251 connects may, in turn, be connected through a router 286 to another network. In general, two nodes 251 may be on a network, adjoining networks, or may be separated by multiple routers 286 and multiple networks as individual nodes 251 on an internetwork. The individual nodes 251 may have various communication capabilities.

In certain embodiments, a minimum of logical capability may be available in any node 251. Note that a plurality of nodes 251 may be referred to, as may all together, as a node 251 or a node 251. Each may contain a processor 252 with more or less of the other components 254-288.

A network may include one or more servers 288. Servers maybe used to manage, store, communicate, transfer, access, update, and the like, any practical number of files, databases, or the like for other nodes 251 on a network. Typically, a server 251 may be accessed by all nodes 251 on a network. Nevertheless, other special functions, including communications, applications, directory services, and the like, may be implemented by an individual server 288 or multiple servers 288.

In general, a node 251 may need to communicate over a network with a server 288, a router 286, or nodes 251. Similarly, a node 251 may need to communicate over another network in an internetwork connection with some remote node 251. Likewise, individual components 254-288 may need to communicate data with one another. A communication link may exist, in general, between any pair of devices.

Figure 12:
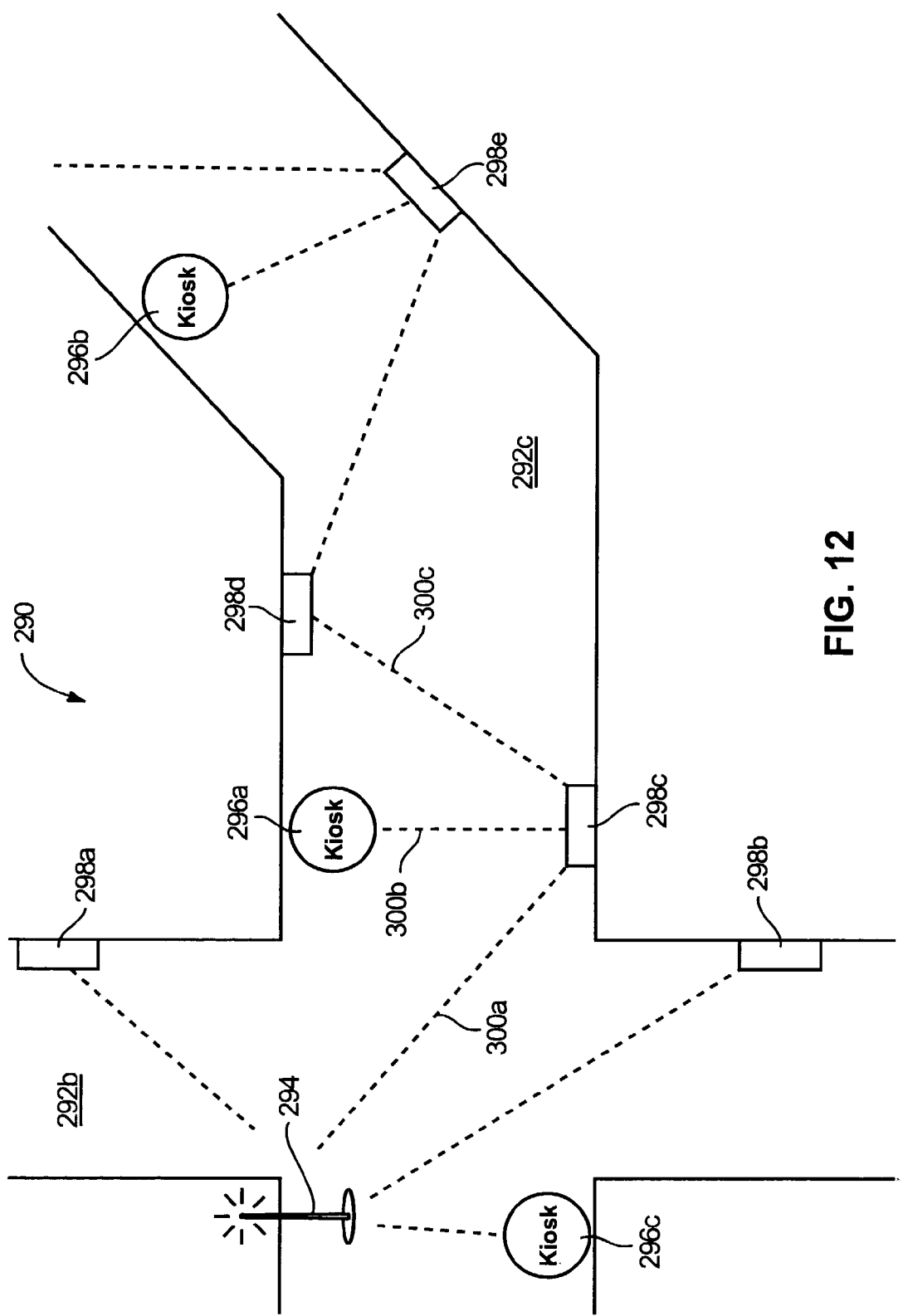
FIG. 12 is a schematic block diagram of one embodiment of a network that may be used to support wireless "kiosks" in accordance with the invention.

Referring to FIG. 12, network access, including Internet access, may be provided on demand to users at diverse locations. For example, wireless portable kiosks 296 may be distributed throughout a business 290 or other premises 290 to provide Internet access, or other network services, to selected users.

For example, in an airport concourse 290, kiosks 296 may be distributed along selected corridors 292 of the concourse. An access point 296 may be located in the concourse 290 to provide Internet access, or other network services, to the kiosks 296. Some kiosks 296c may communicate directly with the access point 294 if they reside within an effective radius of the access point 294. Other kiosks 296 may reside outside of an effective radius of the access point 294.

Repeaters 298 may be distributed throughout the concourse to receive the signal 300 from the access point 294 and to amplify and retransmit the signal from the access point 294 to distant areas. Thus, the effective range of the access point 294 may be extended to reach distant kiosks 296a, 296b. The kiosks 296 may be transported to diverse areas within the concourse 290 as needed depending on pedestrian traffic, demand, space, or like variables. In addition, in certain embodiments, users having laptops 11 or other computing devices 11 may also connect to the network by way of the access point 294 and repeaters 298. In certain embodiments, kiosks 296 may also serve as repeaters 298 in order to reach other distant kiosks 296.

One of ordinary skill in the art will easily recognize that the technology described in FIG. 12 may be used to provide network and Internet access not only to airport concourses 290 but also to malls, schools, businesses, convention centers, hotel lobbies, shopping centers, and the like.

Figure 13:
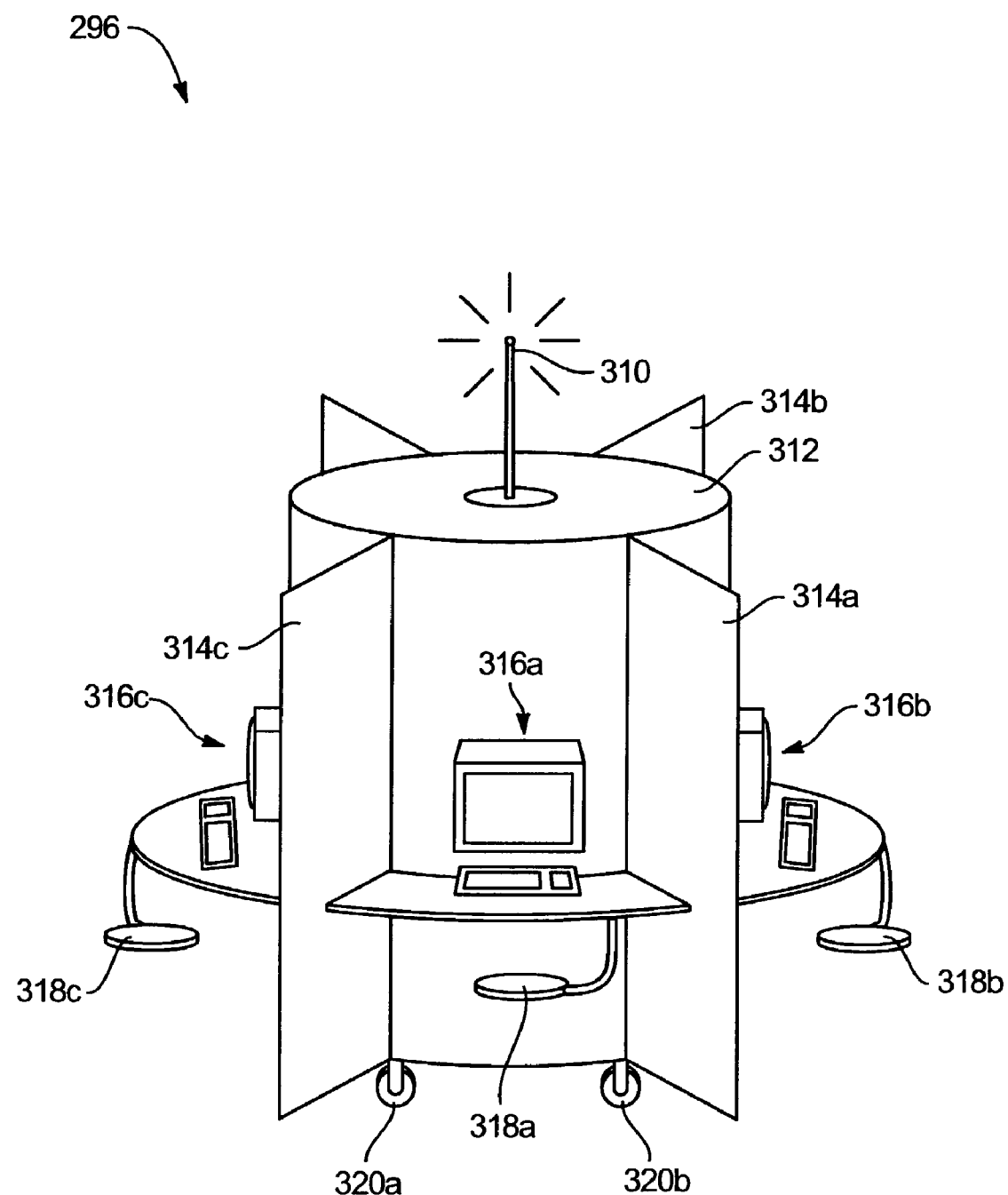
FIG. 13 is a perspective view of one embodiment of a wireless kiosk.

Referring to FIG. 13, a portable kiosk 296 may take on various shapes and configurations. For example, in certain embodiments, the kiosk 296 may include a housing 312. This housing may provide a structural frame 312 for the kiosk 296 in addition to providing an enclosure to store the functional components of the kiosk 296. For example, the kiosk 296 may contain any of the hardware described in FIG. 11.

In certain embodiments, the kiosk may include an antenna 310 for communicating with an access point 294 or a repeater 298. In addition, the antenna 310 may amplify and retransmit the signal received from the access point 294 or repeaters 298 to reach other distant kiosks 296 or other network hardware.

The kiosks 296 may be equipped with wheels 320 or other transport means to easily move the kiosk 296 from site to site depending on pedestrian traffic, demand, space, or other variables. Additionally, the portable kiosks 296 may further include one or a plurality of user stations 316a, 316b, 316c where users may access the Internet or other network services. These stations 316 may or may not have dividers 314 to separate each station. Each station 316 may include a dumb terminal, personal computer, or port where a laptop or other computing device may be connected. In certain embodiments, seating 318 for users may be incorporated into the kiosk 296.

Figure 14:
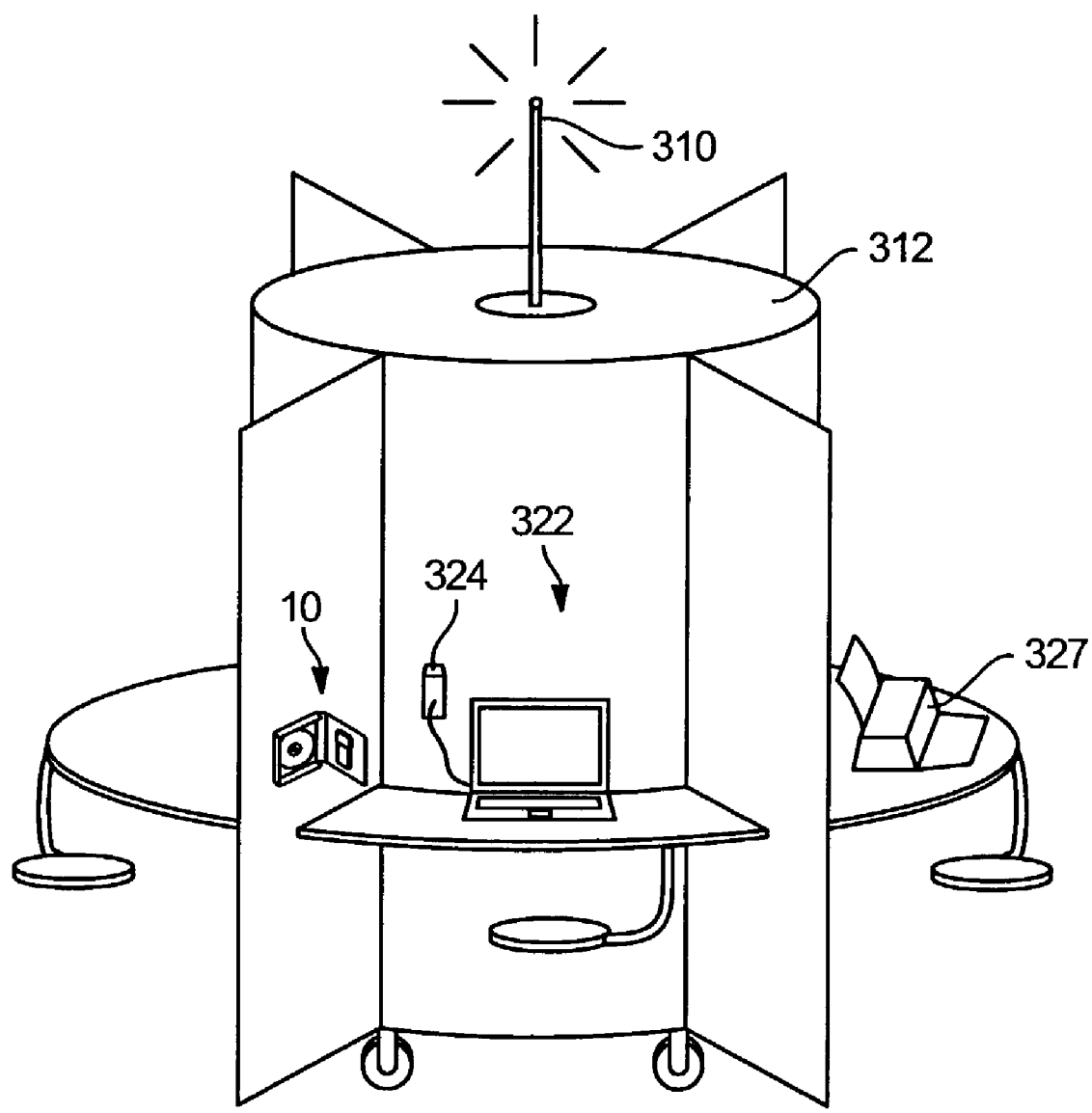
FIG. 14 is a perspective view of one alternative embodiment of a wireless kiosk.

Referring to FIG. 14, in certain embodiments a kiosk 296 may simply include ports 324 where a user may connect a laptop to connect to the Internet 38 or other network services. In other embodiments, a kit 10 may be provided to users at a kiosk 296. The users may install the kit 10 on a laptop 11 or other computing device 11 and may communicate directly with the kiosk 296, a repeater 298, or an access point 294. In certain embodiments, the kiosk 296 may include other computer peripherals 327 such as printers, or any of the peripherals described in FIG. 11.

Referring generally to FIGS. 15-19. In some cases the lack of access to the Internet or other network services may prove very costly to an organization. For example, oil and gas exploration and drilling is a multi-billion dollar industry. In many cases, exploration and drilling are performed in remote locations, lacking access to infrastructure such as power lines, telecommunications lines, and the like. For example, of approximately 12,500 wells drilled in 2001, more than 80% were in rural or remote areas that lacked access to basic telecommunications services. Drilling sites may require temporary setup of massive amounts of drilling equipment, portable buildings for drilling crews and control centers, generators, communications equipment, and the like.

Drilling crews are early risers. Many times the crew must start very early to correlate data from the previous day, format data into "standard reports" and fax these reports back to the home office, which might be located in a major metropolitan area, such as Houston, Tex. In certain circumstances, these reports need to be prepared by 6:00 AM to be communicated back to the home office. However, communication of these "reports" to the home office may be slow and inefficient. Many of the data transfers may occur, by fax or other means, over cellular phone signals. While a cell phone signal (boosted to 3 watts for remote connection) may be reliable, the transfer of data using this method is neither fast nor efficient.

In the oil industry, time is of the essence. Communication delays may prove extremely costly for an energy company if critical information is not provided to (or received from) decision makers, who may be located at a home office, in a rapid manner. Considering that a large oil or gas well may cost $1,000,000 dollars per week to operate, mistakes, break-downs, or delays in information may prove extremely costly.

Internet access at drilling sites, which can improve communication to a home office, is usually a luxury item. In most cases, only one person, the foreman, is connected. This may be due to several factors. While multiple crew members may have computers, these computers may be located in different mobile units. Networking each of the computers together may prove futile since the mobile units are constantly being moved. Hiring a network administrator to setup and tear down the physical wiring and hardware of a network between each move may prove costly and impractical. Thus, crew members, such as geologists, drill operators, and other workers, who might make practical use of Internet access to provide real-time data to the home office, may not have access thereto.

Moreover, once an oil or gas well has been established, they may operate relatively unmanned. These sites may require daily visits by someone to record data. This task may prove costly in many cases. For example, when one considers the thousands of wells in the Gulf of Mexico, the logistics become overwhelming. Using a helicopter pilot to visit these sites, which is very common, may be very costly. Data gathered from the sites may be transmitted to the main office by fax, which may in turn introduce errors into the data.

To the contrary, the Internet may used to provide substantially real-time information to a central office. Unfortunately providing Internet access to a remote locations, such as drilling sites, may be a luxury provided only to select individuals, and sometimes not at all. What is needed is a mobile, seamless, network solution, that may be used by all drill crew members having access to a computer, that may be used to provide the advantages of a network, and Internet access to each computer connected thereto. In addition, access to the Internet may be used to provide customized reporting to a central office. Daily reports may be automated and provided in real time. Moreover, data may be accessed and monitored by decision makers remotely without requiring a visit to a drilling site.

Figure 15:
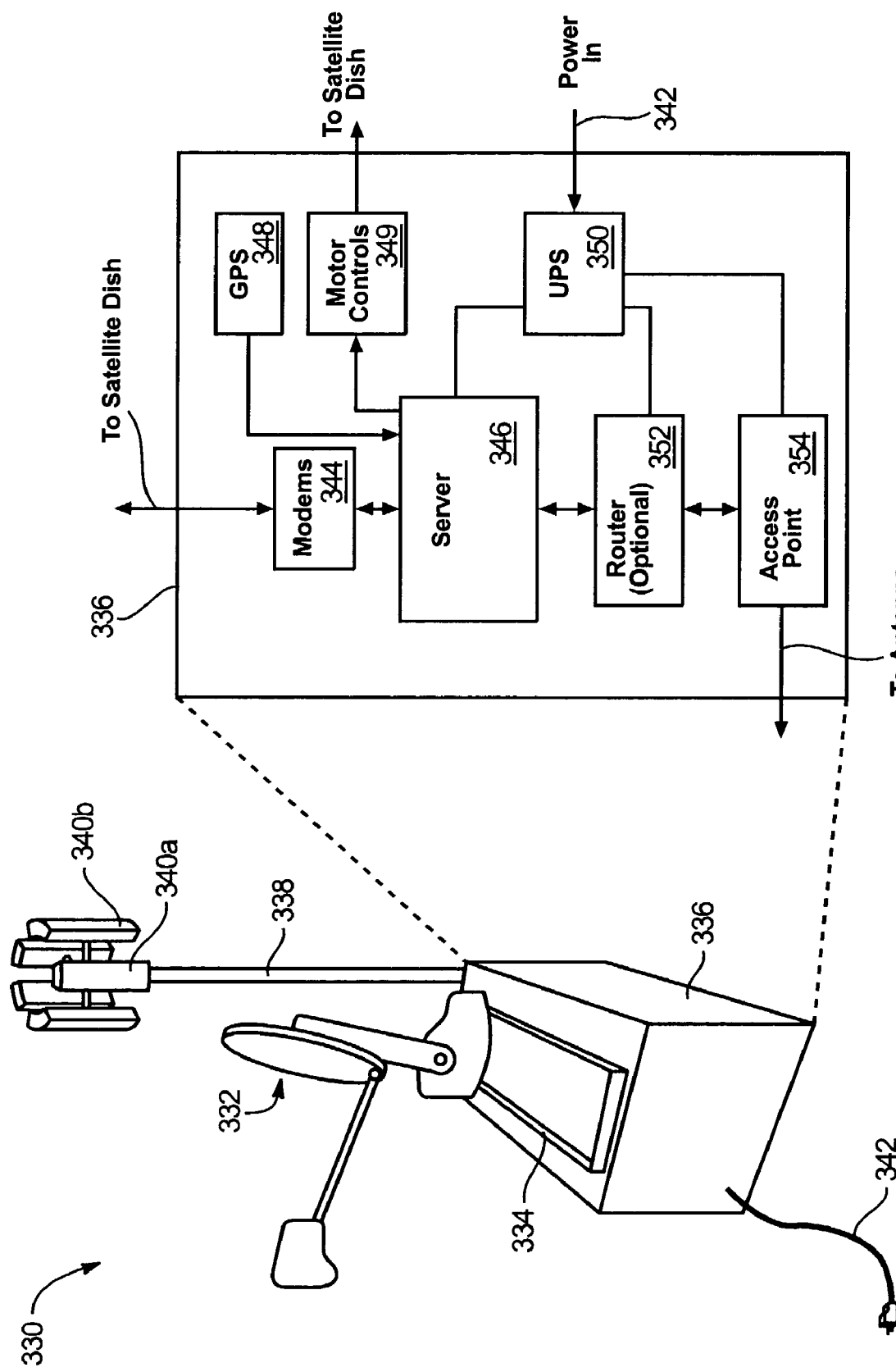
FIG. 15 is a perspective view of one embodiment of a mobile, environmentally-hardened, wireless access point.

Referring specifically to FIG. 15, in one embodiment, a mobile access point 330 may be transported to a remote location, such as a drilling site, military installation, logging site, mining site, or other remote site or aerial location where Internet access and network services are needed. The portable access point 330 maybe conveniently and easily transported from site to site. The mobile access point 330 may function as a gateway 330 or wireless local area network 330 for a plurality of nodes 11, or computers 11, located at a remote site. Thus, wired connections may be avoided. Each node 11 connected to the mobile access point 330 may be provided with wireless network hardware 16, such as wireless network cards 16, and software 14 which may seamlessly connect them to the access point 330. In certain embodiments, the mobile access point 330 may tie nodes 11 together into a local area peer-to-peer network. In other embodiments, the mobile access point 330 may serve as a gateway to the Internet for any or all of the computers 11. In selected embodiments, the mobile access point 330 may include a server, storing information, serving applications, or the like, to any or all of the computers 11.

The mobile access point 330 may include a two-way antenna 332 to create a communications link with a satellite, a communications tower, or an airborne communications node, to provide access to the Internet. Thus, in certain embodiments, the antenna 332 may provide uploading, as well as downloading capability from virtually any remote location. The antenna 332 may be constructed of materials of sufficient durability to withstand harsh weather and travel conditions. In certain embodiments, the antenna 332 may fold down for travel and include control mechanisms to successfully locate and position itself to communicate with a satellite, a communications tower, or an airborne communications node. All of the equipment 330 of the mobile access point 330 may be weather-proofed, sealed, and protected to withstand outdoor environments.

For example, in certain embodiments, a mobile access point 330 may include a two-way antenna 332 mounted to a housing 336. The housing may contain hardware components 344, 346, 348, 349, 350, 352, 354, to provide the system 330 functionality. The mobile access point 330 may include a power cord 342 to provide a power input 342 to the components contained therein. In certain embodiments, the two-way antenna 332 may include a tracking system 334 to allow the antenna 332 to move for adjustment purposes, or to fold down for storage and transport. In addition, an antenna 338 may be attached to the housing 336 or be positioned separate from the housing 336 in order to communicate with nodes 11 connected to the access point 330. In certain embodiments, the antenna 338 may include directional panels 340 to communicate with nodes 11 located at varying angles with respect to the antenna 338.

Internally, the housing 336 may include a wide variety of hardware components 344, 346, 348, 349, 350, 352, 354. For example, the housing 336 may contain modems 344 to communicate with the two-way antenna 332, a global positioning system 348 for determining the location of the access point 330, motor controls 349 for properly directing the two-way antenna 332, a server 346 to provide Internet access and other network services to wireless nodes connected to the access point 330, a uninterrupted power supply 350 to provide a stable power source for the access point 330, and an access point 354 for communicating with nodes 11 connected to the network 330. The mobile access point 330 may also include other hardware, such as a router 352, to provide features, such as security. Realistically, the mobile access point 330 maybe configured in many ways and with diverse computer hardware, as needed, to provide Internet and network services at a remote location. The mobile access point 330 may include any of the hardware and functionality described in FIG. 11, for example.

Figure 16:
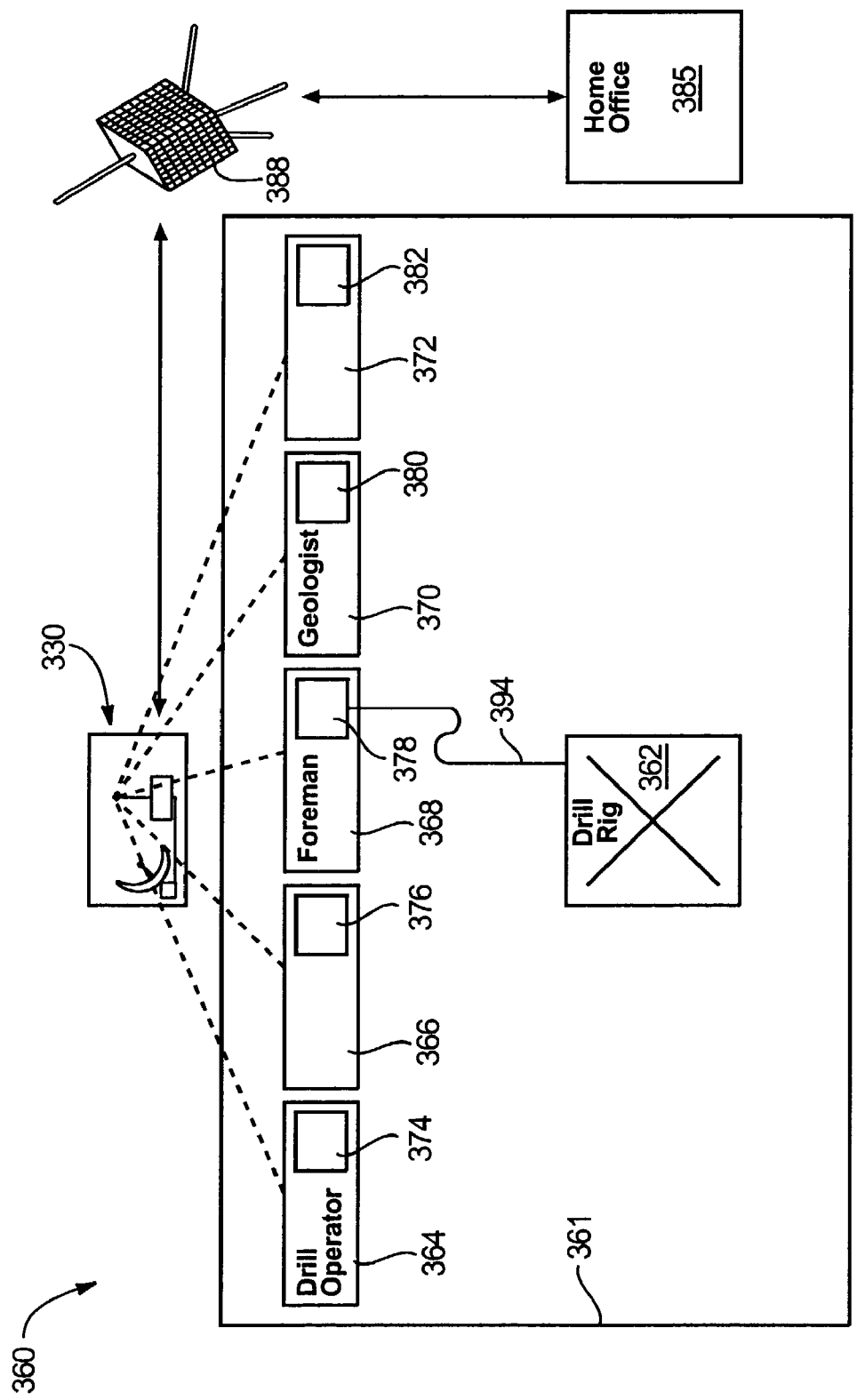
FIG. 16 is a schematic block diagram of one embodiment of a physical layout of a drilling site comprising an oil rig, various mobile units for drilling crew members, and a mobile, environmentally-hardened, wireless access point for use therewith.

Referring to FIG. 16, a drilling site 360 may be located at a remote location and may include an oil rig 362, used to drill for oil, and several portable buildings 364, 366, 368, 370, 372 to house members of a drilling crew, such as a drill operator 364, a foreman 368, and a geologist 370. The drilling site 360 may be enclosed within a temporary perimeter 361, such as a chain-link fence 361, in order to protect equipment within the perimeter 361, prevent unauthorized entry, protect bystanders, or the like. The entire setup of the drilling site 360 maybe such that virtually all pieces are portable and may be assembled and disassembled to be moved from site to site. Larger equipment, such as the oil rig 362 may require many large trucks to transport the components thereof.

In certain embodiments, any or all of the members 364, 366, 368, 370, 372 of the drilling crew may possess a computer 374, 376, 378, 380, 382 to perform their various responsibilities. Due to the mobile nature of equipment at the drilling site 360, networking the computers 374, 376, 378, 380, 382 together with wire may prove problematic since network hardware would have to be disassembled each time a move is made. In addition, it is a further complication to require a technician to be available to maintain the functioning of a network.

The computer 378, or the foreman 368, may have a direct data link 394 to the oil rig 362 in order to monitor the operation thereof and collect data therefrom. As was previously discussed, members 374, 376, 378, 380, 382 of the drilling crew may be required to periodically gather and compile data corresponding to the drilling site 360 to be sent to a home office 35, which may be located at a distant location 385, such as a metropolitan area. Prior to using an apparatus and method in accordance with the invention, crew members 374, 376, 378, 380, 382 would have to manually create reports to send back to a home office 385. These reports, in some cases, might be transmitted by fax over cellular phone service, hardly a real time operation.

Figure 17:
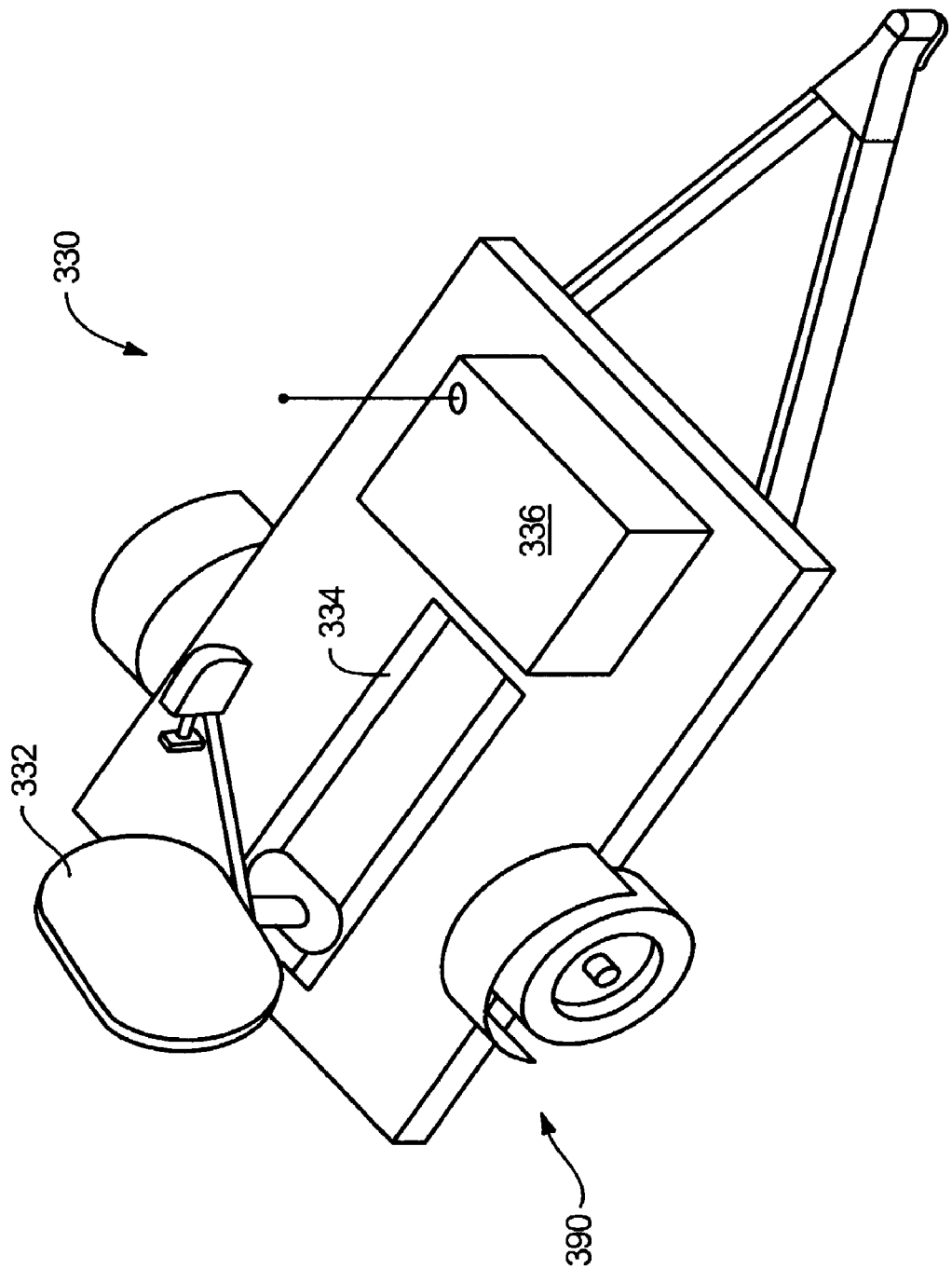
FIG. 17 is a perspective view of one embodiment of a mobile, environmentally-hardened, wireless access point located on a trailer.

Referring to FIG. 17, in certain embodiments, a mobile access point 330 may be located on a trailer 42 which may be transported to a remote location, such as a drilling site 10. The trailer 42 may provide convenient transport of the wireless access point 36 from site to site. The components 332, 334, 336 may be located on the trailer in a wide variety of configurations. For example, the housing 336 and the two-way antenna 332 maybe mounted separately, as illustrated, or the antenna 332 may be mounted to the housing 336.

Figure 18:
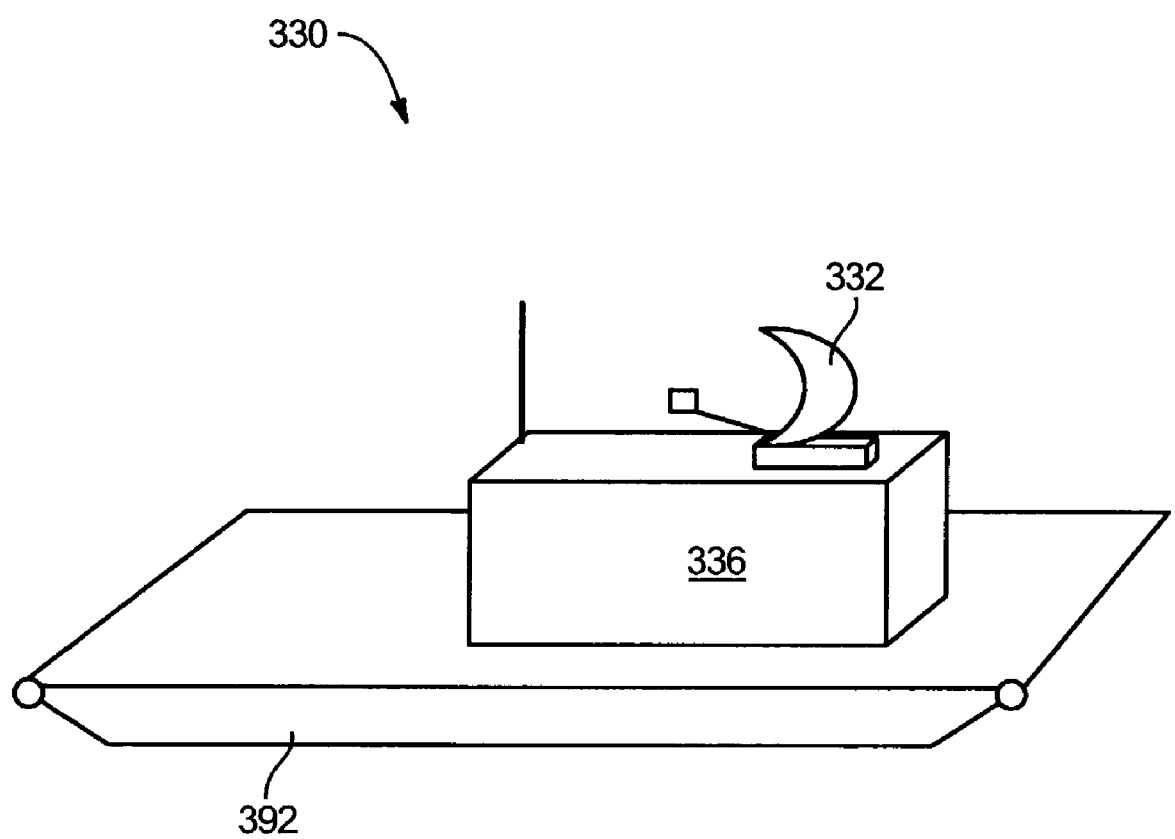
FIG. 18 is a perspective view of one embodiment of a mobile, environmentally-hardened, wireless access point located on a skid.

Referring to FIG. 18, in another embodiment, all of the components described with respect to FIG. 15 may be located on any portable platform 46, such as a skid 46, which may be delivered to a site by truck, air, or the like. As two-way antennas 332 become smaller and are more able to maintain proper positioning while moving on vehicles, airplanes, boats, or other moving objects, the mobile access point 330 may be implemented in moving applications as well.

Figure 19:
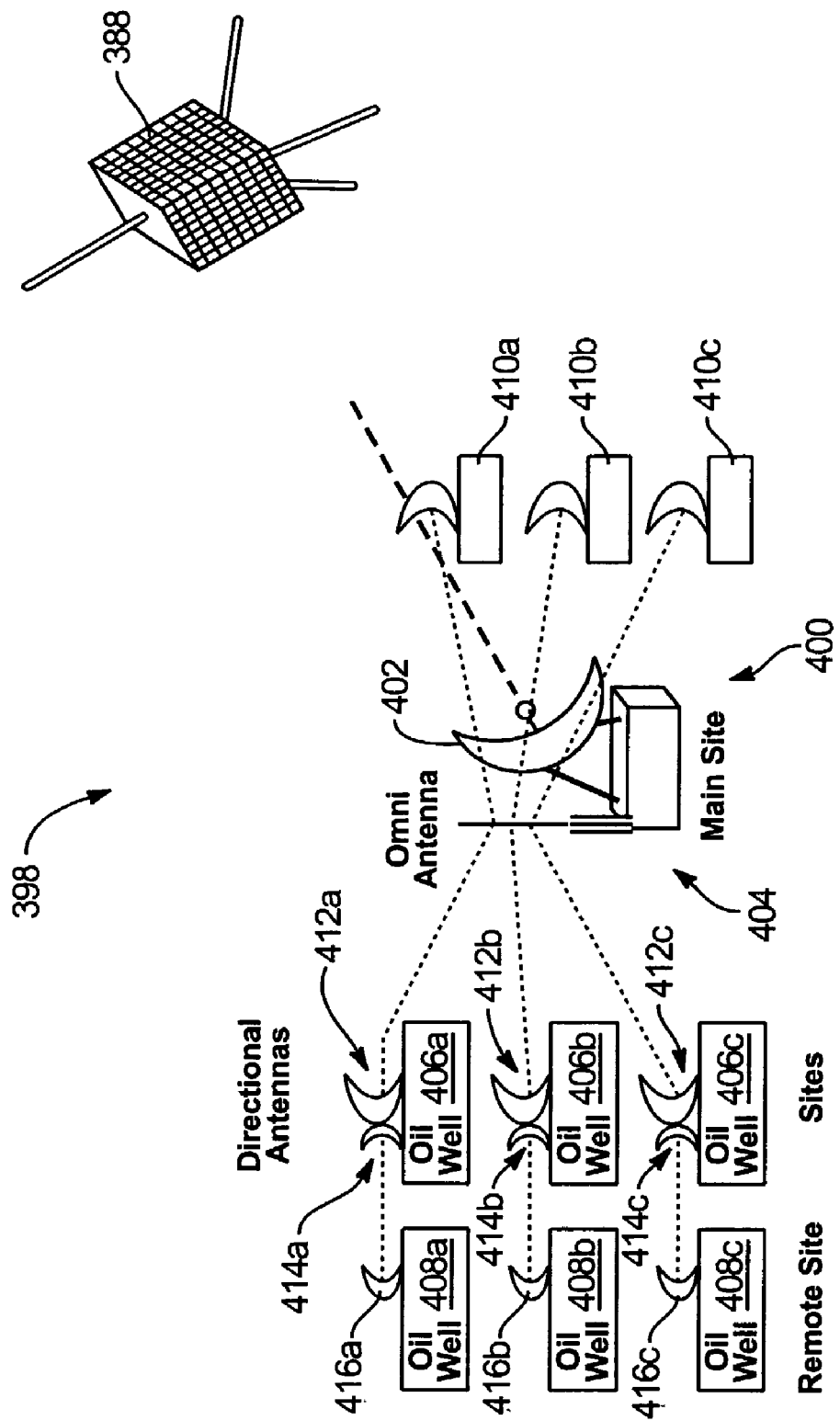
FIG. 19 is a schematic block diagram of one embodiment of an environmentally-hardened wireless network for communicating the status of remote sites to a central location.

Referring to FIG. 19, once oil wells or other remote sites have been established, methods are needed to relay information back to a central location without requiring an individual to actually visit and manually record data from each site. Technology in accordance with the present invention may be used to wirelessly gather data and monitor activity at remote locations. Although, the current description relates primarily to oil and gas exploration and drilling, one of ordinary skill in the art will easily be able to recognize that apparatus and methods in accordance with the invention may be used at remote military installations, logging sites, mining sites, or other remote locations.

For example, in certain embodiments, a primary site 400 may include a two-way antenna 402, such as a satellite dish 402 and accompanying hardware 404. Secondary sites 406 may be connected wirelessly to the primary site 400 using directional antennas 412. These secondary sites 406 may also house basic wireless network hardware and solid state computer hardware that interfaces to wells 406 to provide data therefrom. The secondary sites 406 may also include secondary directional antennas 414 that may point to other remote wells 408, 410, or sites 408, 410. These remote sites 408,410 may be similar to the secondary sites 406, except they may only include a single directional antenna 416, and less hardware.

In certain embodiments, any reasonable number of wells 406, 408, 410 may communicate with a primary site 400 using a single network 398 (primary, secondary, and remote sites). In selected embodiments, all may be solar powered and include a battery backup. In addition all pierces may be hermetically sealed and use convection cooling, thereby eliminating moving parts. Power consumption may be kept very low and installation may be relatively simple.

The description provided with respect to FIG. 1 though 19 have focused primarily on wireless technology. However, one of ordinary skill in the art will readily recognize that apparatus and methods in accordance with the invention, including the kits 10, including hardware 16 and software 14, the turn-key networks 230, the kiosks 296, and the access points 330, may be modified to work with hard-wired systems. For example, the kiosk may simply be plugged into a network port, or the mobile access point 330 may tie into a hard-wired network.

The present invention may be embodied in other specific forms without departing from its spirit or essential characteristics. The described embodiments are to be considered in all respects only as illustrative, and not restrictive. One skilled in the art will recognize that this technology may be applicable for providing real-time reporting and Internet access to wide variety of different industries including but not limited to the logging industry, military applications, cruise ships, construction sites, the coast guard, or any other mobile or remotely located group or organization previously mentioned in the specification of this application. The scope of the invention is, therefore, indicated by the appended claims, rather than by the foregoing description. All changes within the meaning and range of equivalency of the claims are to be embraced within their scope.

What is claimed is:

1. A method for providing a user temporary access to the Internet, the user having a computer controlled at a use site by the user, the computer having original network settings and the method comprising:

providing, by a network access provider independent from the user, a network at the use site remote from a regular place of business of the user and controlled by the network access provider;

installing, by the user, software on the computer effective to automatically and selectively install a temporary network configuration of temporary network settings effective to connect the computer to the remote network;

bypassing, by the software, a detection system detecting new hardware introduced into the computer;

prompting, by the software, the user to specify a criterion to uninstall the temporary network configuration and to restore the original network settings; and uninstalling the temporary network configuration and restoring, automatically by the software, the original network settings upon satisfaction of the criterion.

2. The method of claim 1, wherein the criterion is selected from the group consisting of a time of day, a date, an event, a status of a computer, a location, a user-generated interrupt, and a combination thereof.

3. The method of claim 2, wherein the network settings include network interface card drivers selected from the group consisting of wireless network interface card driven and hard-wired network interface card drivers.

4. The method of claim 3, wherein the network settings include at least one of the group consisting of driver version, default configuration profile settings, current configuration profile settings, DHCP settings, current network protocol settings, application registry keys, existing driver registry entries, network adapter protocols in the registry, network profiles, selectively disabling proxy settings, enabling file and printer sharing, settings indicating an operating system's default browser, and a combination thereof.

5. The method of claim 4, wherein network settings include browser setting selected from the group consisting of browser proxy settings, settings to never dial a connection, settings to dial whenever a network connection is not present, settings to always dial a default connection, offline settings, and a combination thereof.

6. The method of claim 5, further comprising prompting the user, after the criterion has been satisfied, to select an option from the group consisting of leaving the temporary network configuration installed for an extended length of dine, reverting back to the original configuration, and permanently leaving the temporary network configuration installed.

7. The method of claim 5, wherein installing further comprises selectively enabling data encryption of communication between the computer and the network.

8. The method of claim 1, wherein the network settings include network interface card drivers selected from the group consisting of wireless network interface card drivers and hard-wired network interface card drivers.

9. The method of claim 1, wherein the network settings include at least one of the group consisting of driver version, default configuration profile settings, current configuration profile settings, DHCP settings, current network protocol settings, application registry keys, existing driver registry entries, network adapter protocols in the registry, network profiles, selectively disabling proxy settings, enabling file and primer sharing, settings indicating an operating system's default browser, and a combination thereof.

10. The method of claim 1, wherein network settings include browser setting selected from the group consisting of browser proxy settings, settings to never dial a connection, settings to dial whenever a network connection is not present settings to always dial a default connection, offline settings, and a combination thereof.

11. The method of claim 1, further comprising prompting the user, after the criterion has been satisfied, to select an option from the group consisting of leaving the temporary network configuration installed for an extended length of time, reverting back to the original configuration, and permanently leaving the temporary network configuration installed.

12. The method of claim 1, wherein bypassing the detection system occurs during installing software on the computer.

13. The method of claim 1, wherein installing further comprises selectively enabling data encryption of communication between the computer and the network.

* * * * *